US012322133B2

(12) United States Patent
Davydov et al.

(10) Patent No.: US 12,322,133 B2
(45) Date of Patent: Jun. 3, 2025

(54) DEVICES, SYSTEMS AND METHODS FOR PRECISE HUMAN HEAD POSITIONING

(71) Applicant: Spinal Guides Labs, LLC, Carolina, PR (US)

(72) Inventors: Albert Y. Davydov, Carolina, PR (US); Vivek R. Kumar, Madhya Pradesh (IN); Shivang Rakesh Trivedi, Madhya Pradesh (IN)

(73) Assignee: Spinal Guides Labs LLC, Carolina, PR (US)

( * ) Notice: Subject to any disclaimer, the term of this patent is extended or adjusted under 35 U.S.C. 154(b) by 411 days.

(21) Appl. No.: 17/707,153

(22) Filed: Mar. 29, 2022

(65) Prior Publication Data
US 2023/0316564 A1 Oct. 5, 2023

(51) Int. Cl.
*G06T 11/20* (2006.01)
*G06T 7/73* (2017.01)

(52) U.S. Cl.
CPC ...... *G06T 7/74* (2017.01); *G06T 2207/20084* (2013.01); *G06T 2207/30201* (2013.01)

(58) Field of Classification Search
CPC ............ G06T 7/74; G06T 2207/20084; G06T 2207/30201; G06T 2207/20081; G06T 7/73
See application file for complete search history.

(56) References Cited

U.S. PATENT DOCUMENTS

| | | | |
|---|---|---|---|
| 5,971,997 A | 10/1999 | Guthrie et al. | |
| 7,077,822 B1 | 7/2006 | Howard, III | |
| 7,976,568 B2 | 7/2011 | Cheung et al. | |
| 8,848,868 B2 | 9/2014 | Davydov et al. | |
| 9,579,046 B2 | 2/2017 | Davydov et al. | |
| 10,085,815 B2 | 10/2018 | Davydov et al. | |
| 2001/0028697 A1 | 10/2001 | Nahaliel et al. | |
| 2003/0215122 A1 | 11/2003 | Tanaka | |
| 2007/0167741 A1 | 7/2007 | Sherman et al. | |
| 2007/0183567 A1 | 8/2007 | Rotondo et al. | |
| 2007/0242805 A1 | 10/2007 | Somers | |
| 2008/0051651 A1 | 2/2008 | Yamamoto et al. | |
| 2008/0183071 A1 | 7/2008 | Strommer et al. | |
| 2008/0199060 A1 | 8/2008 | Boyden et al. | |
| 2009/0209852 A1 | 8/2009 | Mate et al. | |
| 2011/0157230 A1 | 6/2011 | Davydov | |

(Continued)

FOREIGN PATENT DOCUMENTS

CN 101763636 B 7/2012
CN 109086727 A 12/2018
(Continued)

OTHER PUBLICATIONS

English Translation of CN101763636, Jul. 4, 2012, pp. 1-14.
(Continued)

*Primary Examiner* — Huo Long Chen
(74) *Attorney, Agent, or Firm* — Michael J Porco

(57) ABSTRACT

The present disclosure provides for devices, systems and methods for precise human head positioning in space. The present disclosure provides for control of precise human head positioning in space with use of drawing lines generated via a facial recognition computer software and positioning of sensors with permanent identification markings onto the human head according to those markings.

26 Claims, 17 Drawing Sheets

(56) References Cited

U.S. PATENT DOCUMENTS

| | | |
|---|---|---|
| 2011/0270084 A1 | 11/2011 | Choi et al. |
| 2012/0010533 A1* | 1/2012 | Arnett ................. A61B 5/6814 600/587 |
| 2012/0257162 A1 | 10/2012 | Encaoua et al. |
| 2013/0051523 A1 | 2/2013 | Davydov et al. |
| 2014/0146132 A1 | 5/2014 | Bagnato et al. |
| 2014/0275893 A1 | 9/2014 | Booker |
| 2014/0294273 A1 | 10/2014 | Jaisson |
| 2014/0369584 A1 | 12/2014 | Fan et al. |
| 2016/0070110 A1 | 3/2016 | Ushakov |
| 2017/0020412 A1 | 1/2017 | Davydov et al. |
| 2017/0090220 A1 | 3/2017 | Bonnin et al. |
| 2017/0172690 A1 | 6/2017 | Davydov et al. |
| 2017/0312064 A1 | 11/2017 | Jaisson |
| 2019/0065932 A1* | 2/2019 | Shen ....................... G06N 3/045 |
| 2019/0251336 A1* | 8/2019 | Wu ......................... G06F 18/22 |
| 2021/0349529 A1* | 11/2021 | Winold ................ A61B 5/1124 |

FOREIGN PATENT DOCUMENTS

| | | | |
|---|---|---|---|
| JP | 2003067339 A | * | 3/2003 |
| JP | 3985373 B2 | * | 10/2007 |
| WO | 2006093173 A1 | | 9/2006 |

OTHER PUBLICATIONS

English Translation of CN109086727, Dec. 15, 2018, pp. 1-31.
International Search Report and Written Opinion for PCT Application No. PCT/US2023/016415; dated Jul. 11, 2023; eight (8) pages.

* cited by examiner

DEVICES, SYSTEMS AND METHODS FOR PRECISE HUMAN HEAD POSITIONING

BACKGROUND

Field

The present disclosure relates generally to head and/or human positioning systems and, in particular, to devices, systems and methods for precise human head positioning in space.

Description of the Related Art

There are numerous industrial applications requiring constant and repeated head positioning and repositioning, as well as positioning and repositioning of the headgear sensor system on the head.

Once such application is for medical use. Procedures which involve surgery, radiation or diagnostic imaging procedures performed on the brain, intracranial, or cervical-cranial structures are especially hazardous for the patient, because of the extreme sensitivity of brain tissues, the difficulty in identifying and accessing the particular portion of the brain upon which a procedure is to be performed, and the danger of damaging brain tissues which overlie or surround the portion upon which the procedure is to be performed. The desire for precisely locating and accessing interior portions of the brain and other intracranial structures have led to the development of the neurosurgical subspecialty of stereotactic surgery, or "stereotaxis."

Stereotaxis ordinarily involves the use of an external apparatus attached to the patient's skull during presurgical diagnostic procedures and during surgical procedures. The apparatus provides a grid or framework in fixed position relative to the patient's skull that may be used to establish a coordinate system for locating, in a reproducible manner, the precise position of a lesion or other area within the intracranial area.

However, it is a challenge to control head's position in space and to place and replace a headgear with sensors onto a human head with repeatability, precision, predictability, user friendliness, cost effectiveness, short time consumption and ease.

SUMMARY

The present disclosure provides for devices, systems and methods for precise human head positioning in space. The present disclosure provides for control of precise human head positioning in space with use of line drawings generated via a facial recognition computer software and positioning of sensors, with permanent identification markings, onto the human head according to those markings.

According to one aspect of the present disclosure, a method for positioning a human head includes imaging of a face of a human head with at least one imaging device; generating at least one vertical facial line and at least two horizontal facial lines to be disposed on the image of the face, the at least one vertical facial line and the at least two horizontal facial lines based on facial markings of the face; aligning the human head such that the at least one vertical facial line is aligned with a generated vertical screen line and each of the at least two horizontal facial lines are aligned with a generated horizontal screen line; storing the alignment as a baseline; and repositioning the human head to a desired position.

In one aspect, the generating at least one vertical facial line and at least two horizontal facial lines includes identifying the facial markings on the human head using at least one facial recognition application as key points, and connecting the key points to draw the at least one vertical facial line and at least two horizontal facial lines.

In another aspect, the at least one facial recognition application includes a convolutional neural network.

In a further aspect, the generated vertical and horizontal screen lines represent a 90 degrees face to imaging device location.

In another aspect, a lower line of the aligned at least two horizontal facial lines and generated horizontal screen lines is stored as a default pitch line.

In yet another aspect, the default pitch line is broken into two segments at the at least one vertical facial line.

In still another aspect, the aligning the human head includes aligning the two segments of the default pitch line to be parallel to an upper line of the two horizontal facial lines.

In a further aspect, the default pitch line is normalized to compensate for differences of facial architecture of the human head.

In one aspect, each segment of the two segments of the default pitch line is drawn connecting identified facial markings disposed at a tip of a nose of the face and at least one point on a perimeter of the face.

In another aspect, the at least one vertical facial line is drawn connecting identified facial markings disposed vertically along a center of a nose of the face.

In a further aspect, a yaw angle of the human head is determined from the at least one vertical facial line and the generated vertical screen line.

In yet another aspect, an upper of the at least two horizontal facial lines is drawn connecting identified facial markings disposed at opposite ends of a brow line of the face.

In one aspect, a roll angle of the human head is determined from the upper of the at least two horizontal facial lines and the generated horizontal screen line.

In another aspect, the method further includes storing coordinates associated to the alignment of the repositioned human head at a first point in time and repositioning the human head according to the stored coordinates at a second point in time.

In yet another aspect, the methods further includes disposing a head gear on the human head, the head gear including a center marking indicating the center of the head gear and an edge marking; aligning the center marking of the head gear to the least one aligned vertical line; aligning the edge marking of the head gear to at least one of the aligned horizontal lines; and storing the alignment of the head gear to the human head.

In still another aspect, the method further includes storing coordinates associated to the alignment of the repositioned human head at a first point in time and transferring the stored coordinates to at least one sensor coupled to at least one body part.

According to another aspect of the present disclosure, a system for positioning of a human head includes at least one imaging device that images a face of a human head; at least one processing device that generates at least one vertical facial line and at least two horizontal facial lines to be disposed on the image of the face via a display device, the at least one vertical facial line and the at least two horizontal facial lines based on facial markings of the face; the display device that enables alignment of the human head such that the at least one vertical facial line is aligned with a generated vertical screen line and each of the at least two horizontal facial lines are aligned with a generated horizontal screen line; and at least one memory that stores the alignment as a baseline, wherein upon repositioning the human head to a desired position, the at least one processing device continuously updates the at least one vertical facial line and the at least two horizontal facial lines based on facial markings of the face.

In a further aspect, the at least one processing device executes at least one facial recognition function for identifying the facial markings on the face as key points and connects the key points to draw the at least one vertical facial line and the at least two horizontal facial lines.

In one aspect, the at least one facial recognition function includes a convolutional neural network.

In a further aspect, the system further includes a head gear configured to be disposed on the human head, the head gear including a center marking indicating the center of the head gear and an edge marking, wherein the display device enables alignment of the center marking of the head gear to the least one aligned vertical line and alignment of the edge marking of the head gear to at least one of the aligned horizontal lines; and upon alignment, the at least one processing device stores the alignment of the head gear to the human head in the at least one memory device.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Figure 1:
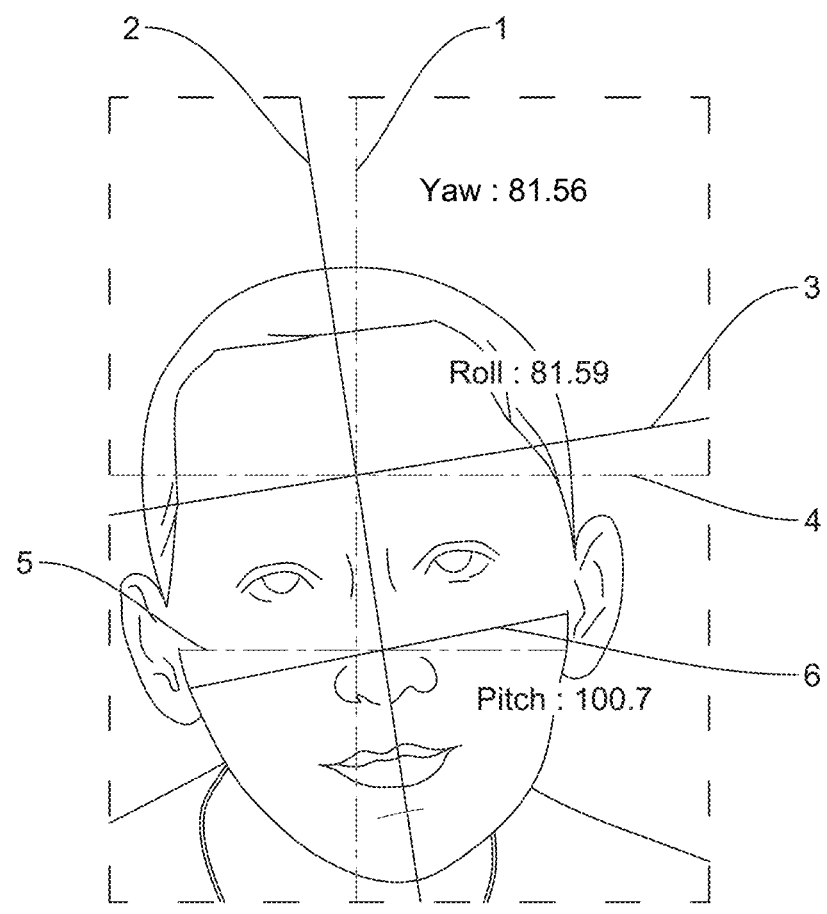
FIG. 1 illustrates facial lines and screen lines positioned on an image of a face in accordance with an embodiment of the present disclosure.

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software-based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

The present disclosure relates to a system and method of orientating a human head utilizing an imaging device, e.g., a camera device, which allows control of the head's positioning with computer-generated lines disposed on an image of the face (e.g., the lines being generated via facial recognition software) while moving the patient's head. Furthermore, the present disclosure relates to the use of the computer-generated lines that are based on computer-identified facial markings that relate to facial lines of a human head and lines identified on a headgear sensor allowing precise and controllable positioning of the headgear sensor on the head.

The present disclosure provides for positioning of a head and/or headgear with the use of computer facial recognition software. The computer facial recognition software identifies special facial markings and generates visible lines on a display device, such as a computer screen, on the facial image thereby allowing precise controllable positioning and repeatable repositioning of the head with respect to an imaging device, e.g., camera device or an object with a camera device. Additionally, the present disclosure enables precise, controllable and repeatable positioning of headgear with permanent markings, or a headband object, and the head relative to these facial lines.

Figure 2:
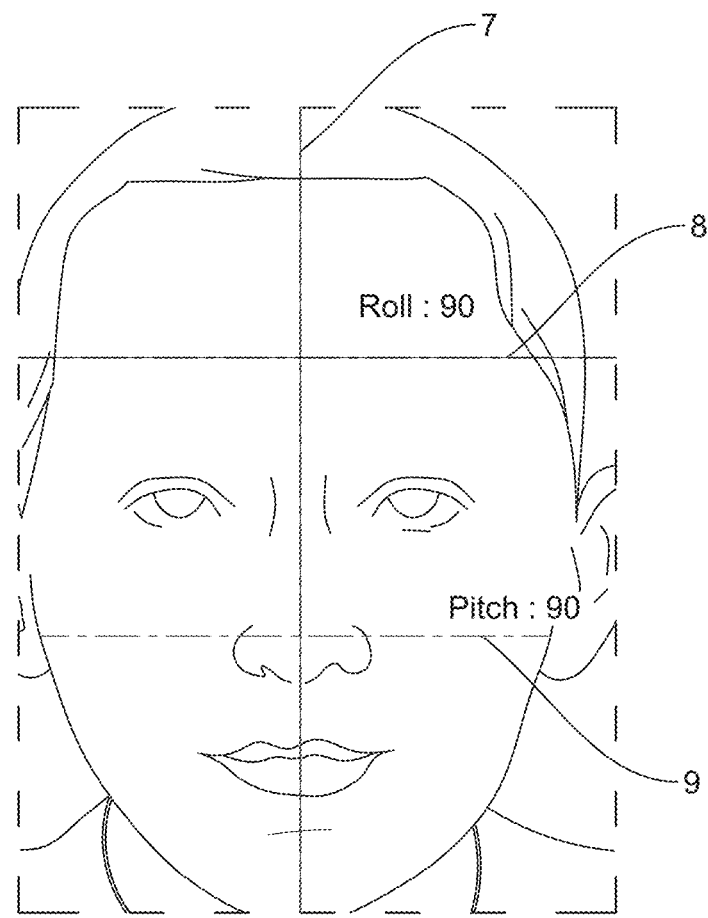
FIG. 2 illustrates desired positioning of screen lines on an image of a face in accordance with an embodiment of the present disclosure.

The computer-generated lines employed by the systems and methods of the present disclosure will be described initially to facilitate understanding of the present disclosure. There are two types of computer-generated lines employed in the system and method of the present disclosure: 1.) screen lines and 2.) facial lines. Referring to FIGS. 1 and 2, the screen lines and facial lines will be described.

Screen Vertical Line 1 is a vertical line showing the center position projected by the imaging device to locate where the 90-degree object to camera location is drawn on a computer screen vertically. Facial Vertical Line 2 is illustrated in the center of the face and is represented by the line drawn from certain markings found on the face, as will be described below in relation to FIGS. 13 and 14. Upper Facial Horizontal Line 3 is illustrated on the forehead and is represented by a line drawn from certain markings identified on the face. Upper Screen Horizontal Line 4 is illustrated on the forehead and is projected by the imaging device to show the 90-degree location respective to the camera device projected horizontally. Lower Screen Horizontal Line 5 is illustrated on the screen below the Upper Screen Horizontal Line 4. The Lower Screen Horizontal Line 5 is the line that represents the location at which point a Default Pitch Line will be marked once the 90-degree location of the face to the imaging device is obtained and baseline pitch orientation is satisfied and saved. The Lower Facial Horizontal Line 6, after coinciding with the Lower Screen Horizontal Line 5 to become Single Horizontal Line 9 will also be known as the Default Pitch Line, is illustrated on the facial image below the Upper Facial Horizontal Line 4 and is represented by a line produced by the software taken from facial markings.

Single Horizontal Line 9 becomes Default Pitch Line 9 on the same location where Lower Facial Horizontal Line 6 is located at the moment of registering the default pitch angle. In FIG. 2, the Pitch Line shown is a normalized line, as will be explained in more detail below.

Figure 5:
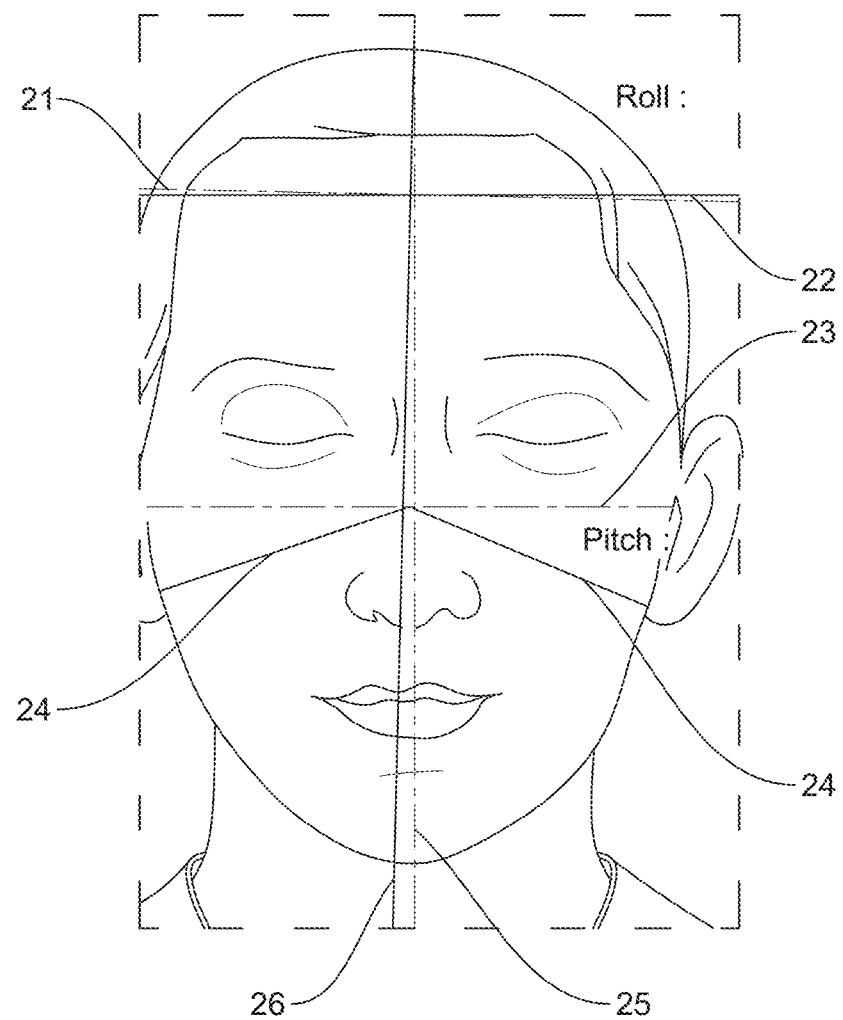
FIG. 5 illustrates initial positioning of screen lines with a normalized pitch angle on an image of a head in accordance with an embodiment of the present disclosure.
Figure 6:
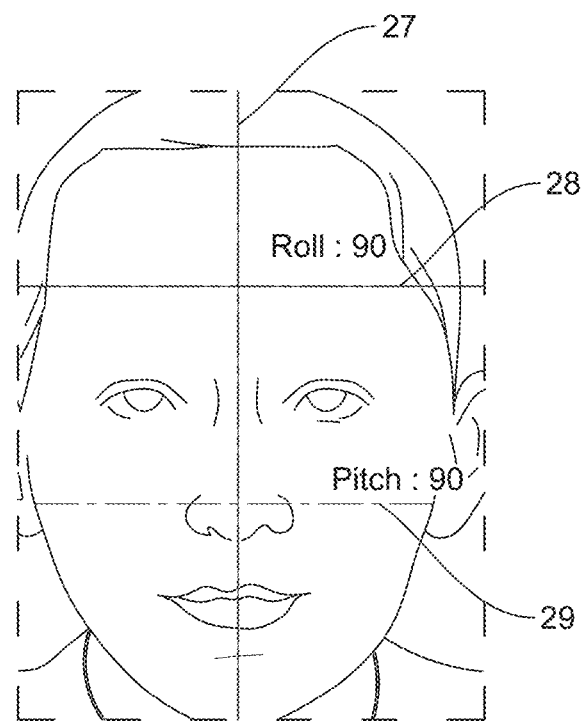
FIG. 6 illustrates default pitch line positioning with a normalized pitch angle in accordance with an embodiment of the present disclosure.

Once the 90 degree face/object to imaging device is attained the head is positioned into a Default Pitch Angle at the desirable pitch position using either electronic sensors or other means (e.g., data from pixels), and the facial image markings are recorded with the Default Pitch Angle (normalized, see below). The Default Pitch Angle extends from the point of and coincides with the Lower Facial Horizontal Line 6 and Lower Screen Horizontal Line 5 which can be broken into two lines extending from Facial Vertical Line 2 in the middle of the facial image, as shown and described in relation to FIG. 5. When there is a positive or a negative pitch angle, the operator sees an angle breaking the Default Pitch Angle Line 9 into two lines 24 as shown in FIG. 5. When the Default Pitch Angle value is at ZERO it becomes linear in relation to the operator and the patient as shown in FIG. 6 Line 29.

Figure 11:
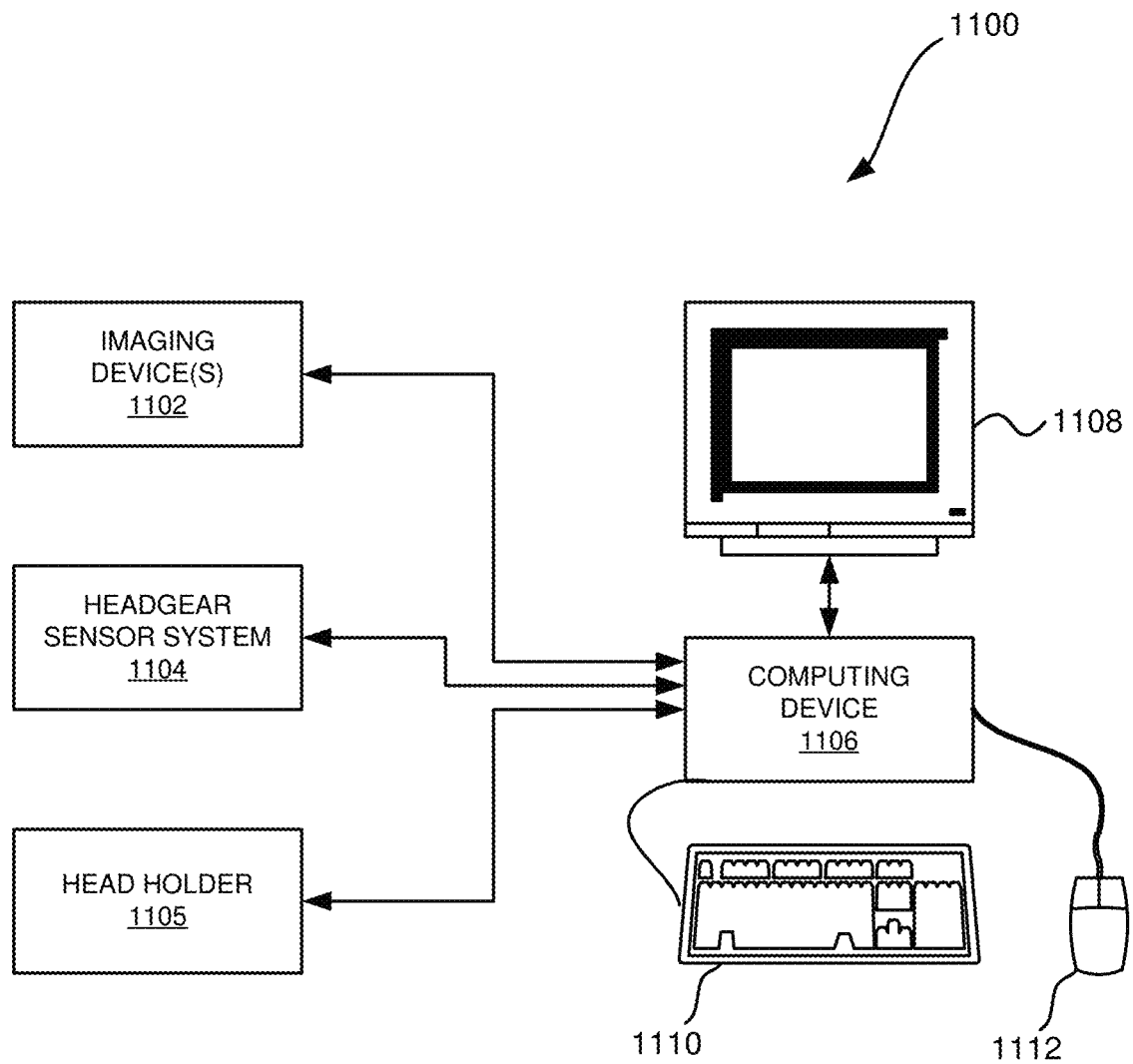
FIG. 11 is a block diagram of a positioning system in accordance with an embodiment of the present disclosure.

Referring to FIG. 11, a positioning system 1100 in accordance with an embodiment of the present disclosure is illustrated. The system 1100 includes at least one imaging device 1102, a headgear sensor system 1104, a head holder 1105 and a computing device 1106. It is to be appreciated that the imaging device 1102 may be a camera device, video camera, tablet, mobile device such as a mobile phone, etc. Details of the computing device 1106 will be described below in relation to FIG. 12, however, it is to be appreciated that the computing device 1106 includes input/output devices such as a display device 1108 (e.g., a monitor, touchscreen, etc.), a keyboard 1110, a mouse 1112 and at least one speaker. It is further to be appreciated that the computing device 1106 may be a single device that includes an imaging device, a display device and input/output devices.

Figure 3:
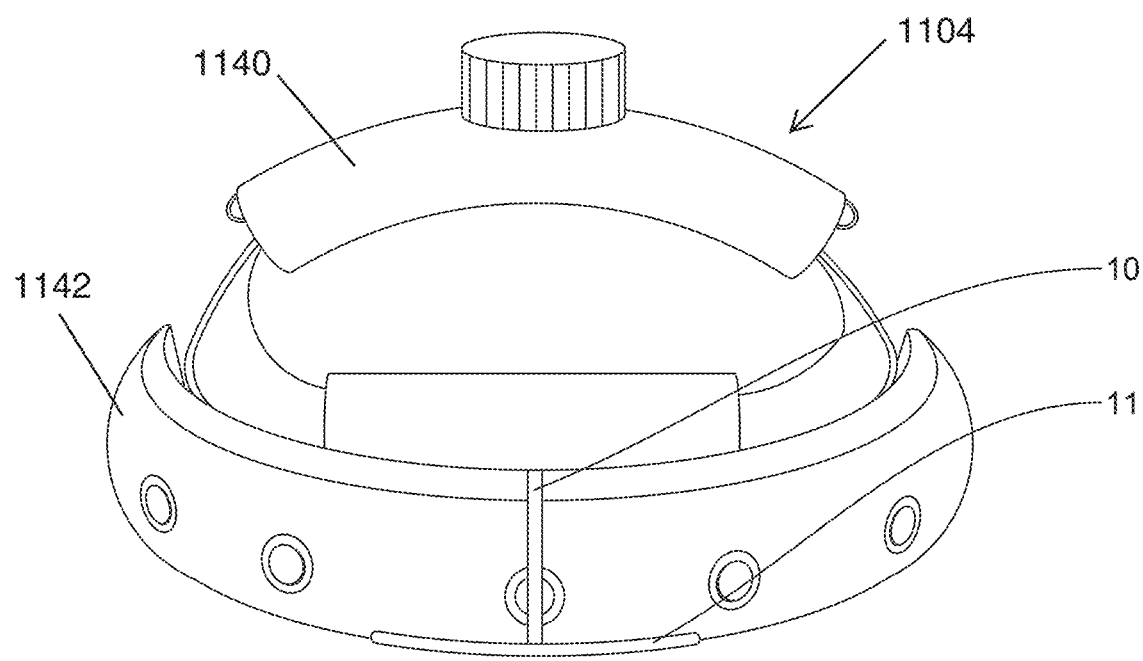
FIG. 3 is an exemplary headgear employed in a positioning system in accordance with an embodiment of the present disclosure.

Referring to FIG. 3, a headgear sensor system 1104 is illustrated. An exemplary headgear sensor system is commercially available from Keeler USA of Malvern, PA. Headgear 1104 includes a support portion 1140 which is to be placed on the top of a head and supports other components of the headgear 1104 on the head. Additionally, the headgear 1104 includes at least one strap 1142 which secures the headgear 1104 to a head. It is to be appreciated that any headgear, or any strap, may be used with the system and method of the present disclosure as long as the headgear includes at least two permanent markings. Headgear 1104 includes a center marking 10 which is a vertical line located on the headgear 1104 representing an exact center of the headgear device and an edge marking 11, which is located on the front of the headgear's strap 1142 and is represented by a line at the lower edge of the strap 1142.

Figure 4:
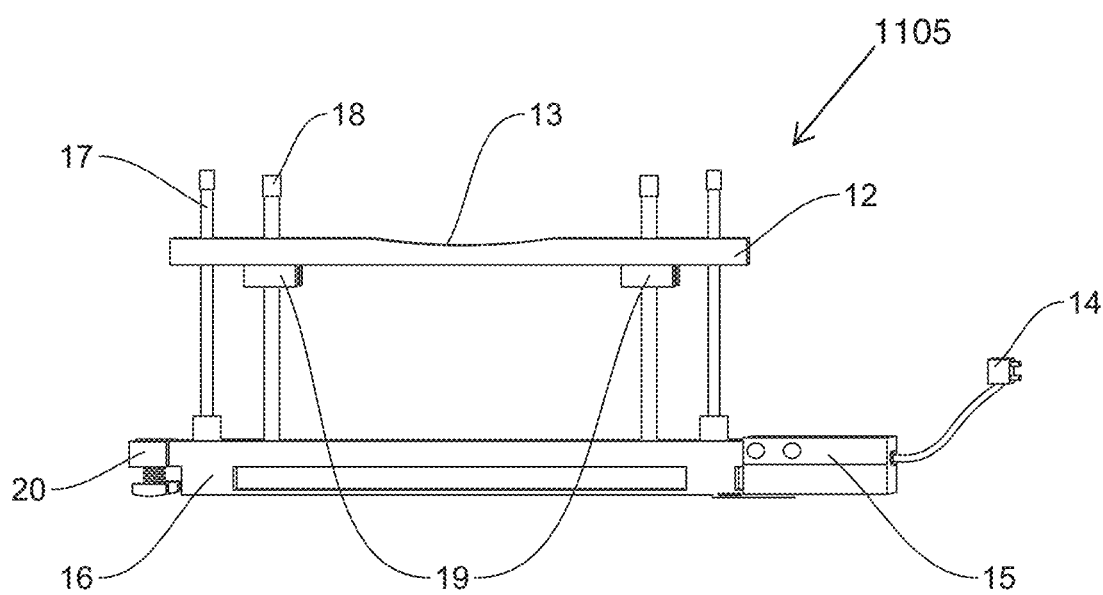
FIG. 4 is an exemplary head holder employed in a positioning system in accordance with an embodiment of the present disclosure.

Stability during positioning of the head in front of the imaging device 1102 is obtained with use of an accessory stationary device such Head Holder 1105. The Head Holder device 1105 is used to position the head to the desired initial position. Referring to FIG. 4, the head holder 1105 includes a Horizontal Shelf 12, on which the head is positioned next to the imaging device 1102 for the first time. The horizontal shelf 12 may be moved up and down to accommodate different heights in respect to the imaging device 1102. The location of the horizontal shelf 12 may be recorded in each instance for future reference in case repositioning of the Headgear Sensor System 1104 is necessary. The patient's lower jaw during the methods and procedures of the present disclosure is to be fully engaged with its chin with the Horizontal Shelf 12. The Horizontal Shelf 12 has a Chin Rest 13 where the patient's chin is positioned during the procedure. The method of the present disclosure may utilize a head holder device to navigate to a desired head's position.

Optionally, the Head Holder device 1105 is an electrically powered device that uses an electrical plug 14 for an electrical socket and a control unit 15 for motors 16 on both sides to move the Horizontal Shelf 12 upwards and downwards through threaded rods 17 on both sides, one for each motor, as needed. The Head Holder system 1105 uses vertical directional rods 18 that limit movement up and down and bearings 19. The Head Holder System 1105 has adjustable four legs 20 that allow positioning of the Head Holder System 1105 on a surface such as, but not limited to, a desk. In certain embodiments, the head holder system 1105 is coupled to the computing device 1106 where the computing device 1106 controls the height of the Upper Horizontal Shelf 12 by transmitting signals to the control unit 15 and motors 16.

The system and method of the present disclosure may be used, for example, to position the image of the face, or in this context, the head without any angular distortion, as in a particular task. The present disclosure solves the issue of positioning the same way with any XYZ coordinates. In this example, the basic goal of obtainment of free angular image distortion is to position an object (e.g., a face) orthogonally, at 90-degree angle to the imaging device. This position attains zero angular distortion. With this method, clean undistorted default data of initial positioning of any head position may be recorded and controlled for future precise repositioning, for a purpose, as an example, to control of angular optical distortion while imaging is performed.

Initially, the Pitch Angle is registered as ZERO at the time when the head is in the Head Holder 1105 at accepted spatial head to imaging device relationship and is recorded as the default position (i.e., 90 degree to the camera device) and with acceptable pitch. As shown in FIG. 2, the zero pitch angle is registered when the position of the head is such that Facial Vertical Line 2 and Screen Vertical Line 1 are moved to create one Single Vertical Line 7, the Upper Facial Horizontal Line 3 and Upper Screen Horizontal Line 4 are moved to create one Upper Single Horizontal Line 8 and the Lower Facial Horizontal Line 6 and Lower Screen Horizontal Line 5 coincide together into Single Horizontal Line 9. Once an operator of system 1100 is satisfied with the pitch of the head's positioning in respect to the imaging device 1102, the record is saved as Baseline Zero in a memory of the computing device 1106. Once the zero pitch angle is saved, the Single Horizontal Line 9 becomes Default Pitch Line 9.

After achieving the 90-degree face to camera positioning, the system may alert the operator with a signal or visual effects seen on the computer screen 1108 allowing the operator to understand that desired positioning is obtained. For example, as a head is moved within the imaging space, the computing device 1106 may generate a sound (to be played by a speaker) that the facial lines generated are either aligned with the screen lines or are close to be aligned. In one embodiment, the generated sound will change pitch or tone as the head comes closer to alignment and then generate a different, distinct sound when the head is at an acceptable pitch angle, or at pitch angle zero.

Operating Procedure

A person being studied is seated in front of the imaging device 1102 with his head positioned on the Head Holder device 1105. The person rests his/her lower jaw fully engaged against the Horizontal Shelf 12 of the Head Holder 1105.

The facial and screen lines are then generated by the computing device 1106 executing facial recognition software. In one embodiment, the operator is able to see in different respective colors the Facial Lines and the Screen Lines for identification. There is a Facial Vertical Line generated from the facial markings and a Screen Vertical Line showing where the 90-degree location of Facial Vertical Line respective to the camera device should be to position patient's head at 90 degrees to the camera device (for example, to have no angular optical distortions). There are four Horizontal Lines crossing said respective vertical lines at two distinct, upper or lower levels: Upper Facial and Lower Facial Horizontal Lines, all generated via data gathered from facial markings, and Upper Screen and Lower Screen Horizontal Lines projecting where the face with respective Facial Horizontal Lines must be in order to be at 90-degree-to-camera position.

An exemplary method for identifying facial key points and generating lines from the identified facial points will now be described in relation to FIGS. 13-19.

Figure 13:
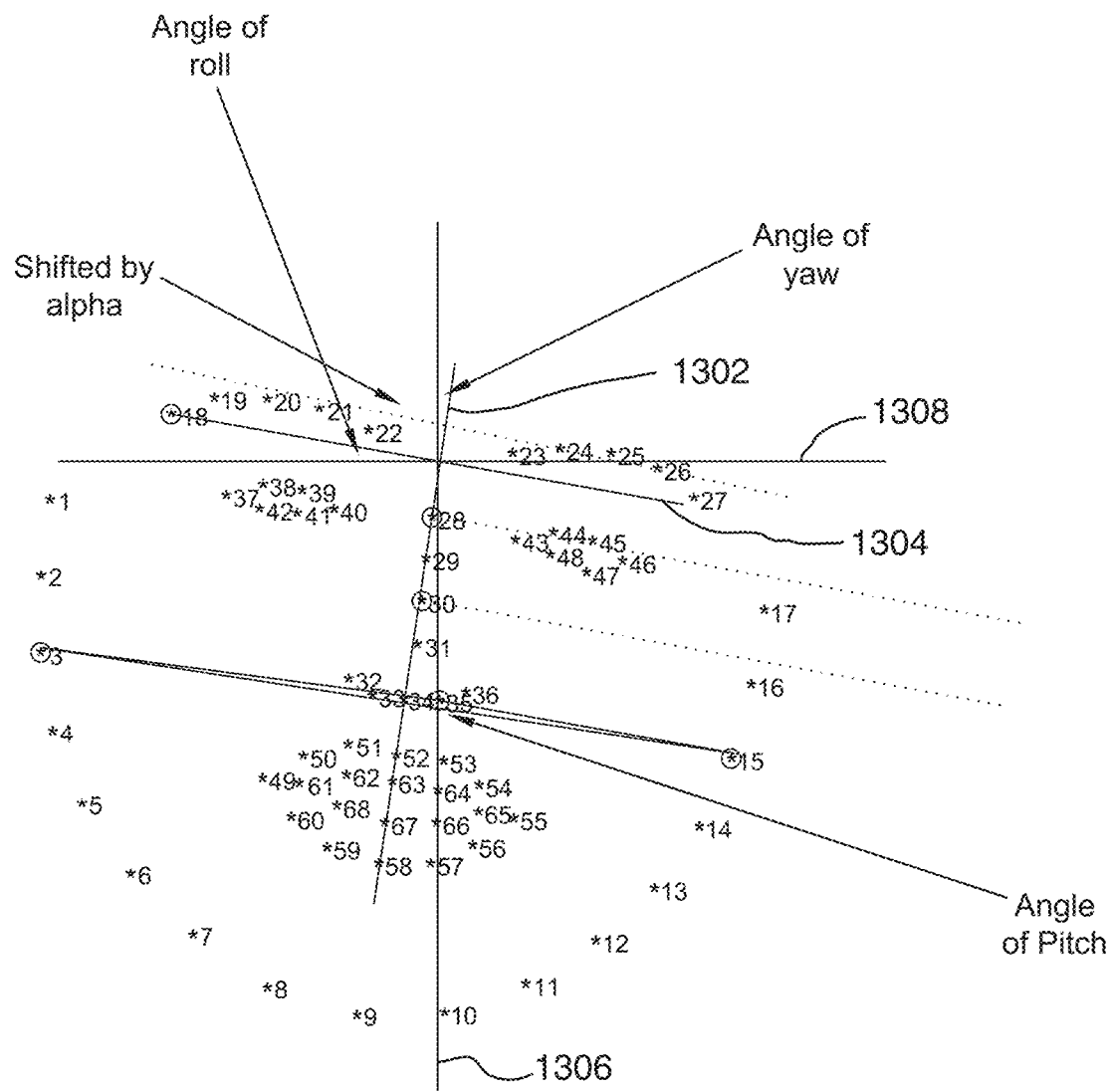
FIG. 13 illustrates facial key point mapping to calculate yaw, pitch and roll of a face in accordance with an embodiment of the present disclosure.
Figure 14:
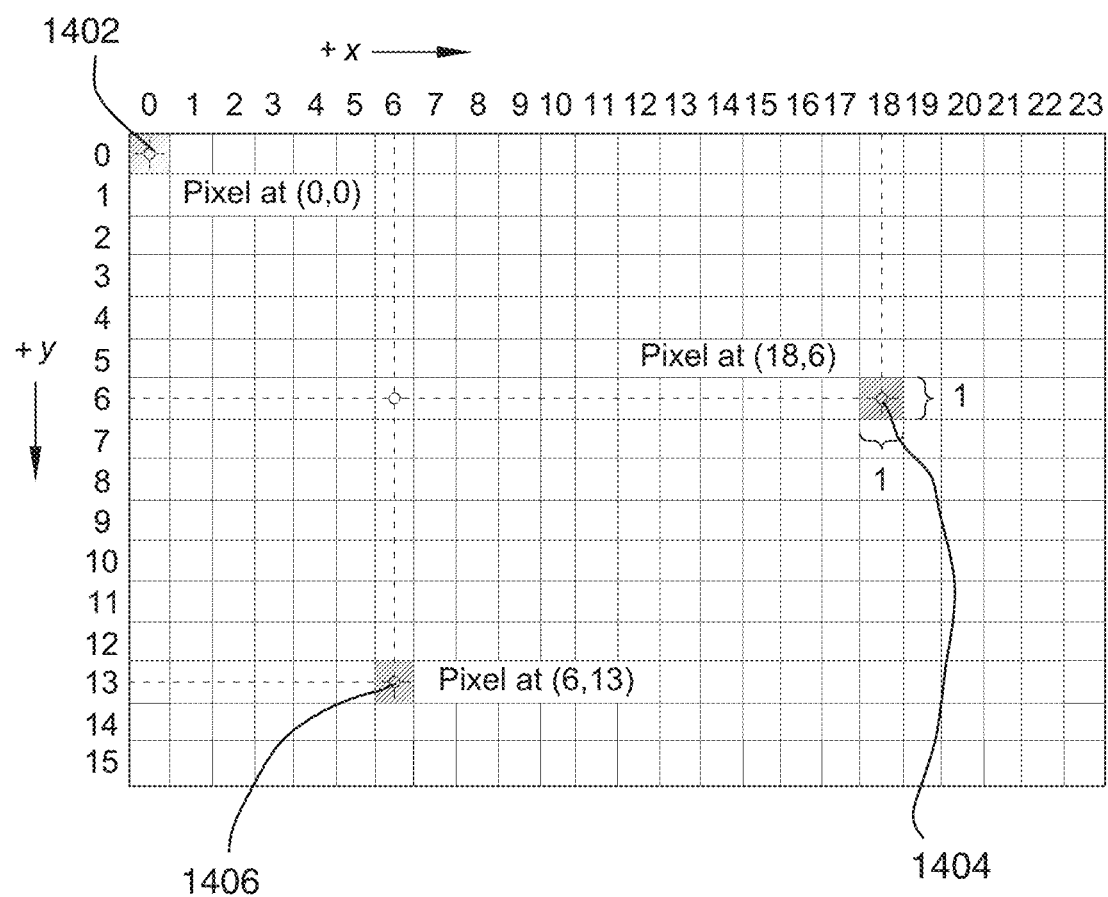
FIG. 14 illustrates a frame of reference to calculate a pitch angle of a face in accordance with an embodiment of the present disclosure.

The system calculates yaw, pitch and roll for a face in view from a camera by using simple geometry drawn by using facial key point mapping as shown in FIG. 13. Referring to FIG. 14, an example frame of reference is illustrated to facilitate understanding of the values and lines explained below in Table 1. It is to be appreciated that values along the x-axis refer to img-width and values along the y-axis refer to img-height. For example, point 1402 is a pixel located at (0,0), i.e., x=0 and y=0, point 1404 is a pixel located at (18,6), i.e., x=18 and y=6, and point 1406 is a pixel located at (6,13), i.e., x=6 and y=13. In Table 1 below, it is to be appreciated that the lines described in column 2 are generated using point 1 as described in column 3 and point 2 as described in column 4, where Pn(x) refers to the x pixel value for facial point "n" and Pn(y) refers to the y pixel value for facial point "n".

TABLE 1

| N | Line | Point 1 | Point 2 |
|---|---|---|---|
| 1 | Computer Vertical Line (1306 FIG. 13) | (P18(x) + P27(x))/2, 0 | (P18(x) + P27(x))/2, img-height |
| 2 | Computer Horizontal Line (1308 FIG. 13) | 0, (P18(y) + P27(y))/2 − distance * Alpha Value | Img_width, (P18(y) + P27(y))/2 − distance * Alpha Value |
| 3 | Facial Vertical Line (1302 FIG. 15 & FIG. 13) | [P28(x) − (P31(x) − P28(x))/P31(y) − P28(y)) * P28(y)], 0 | [P28(x) − (P31(x) − P28(x))/P31(y) − P28(y)) * (P28(y) − img-height)], img-height |
| 4 | Facial Horizontal Line (1702 FIG. 17 & 1304 FIG. 13) | 0, [P18(y) − (P27(y) − P18(y))/P27(x) − P18(x)) * P18(x)] − distance * Alpha Value | Img_width, [P18(y) − (P27(y) − P18(y))/P27(x) − P18(x)) * (P18(x) − img-width)] − distance * Alpha Value |
| 5 | Pitch Line Not Normalized (Jaw to Nose) (1802-1 FIG. 18) | P3(x), P3(y) | P34(x), P34(y) |
| 6 | Pitch Line not Normalized (Nose to Jaw) (1802-2 FIG. 18) | P34(x), P34(y) | P15(x), P15(y) |
| 7 | Lower face horizontal line Not Normalized (1804 FIG. 18) | P3(x), P34(y) | P15(x), P34(y) |

TABLE 1-continued

| N | Line | Point 1 | Point 2 |
|---|------|---------|---------|
| 8 | Pitch Line Normalized (Jaw to Nose) (1802-1 FIG. 19) | P3(x), P3(y) | P34(x), P34(y) − base_line_pitch_delta |
| 9 | Pitch Line Normalized (Nose to Jaw) (1802-2 FIG. 19) | P34(x), P34(y) − base_line_pitch_delta | P15(x), P15(y) |
| 10 | Lower face horizontal line (Normalized) (1804 FIG. 19) | P3(x), P34(y) − base_line_pitch_delta | P15(x), P34(y) − base_line_pitch_delta |

Figure 15:
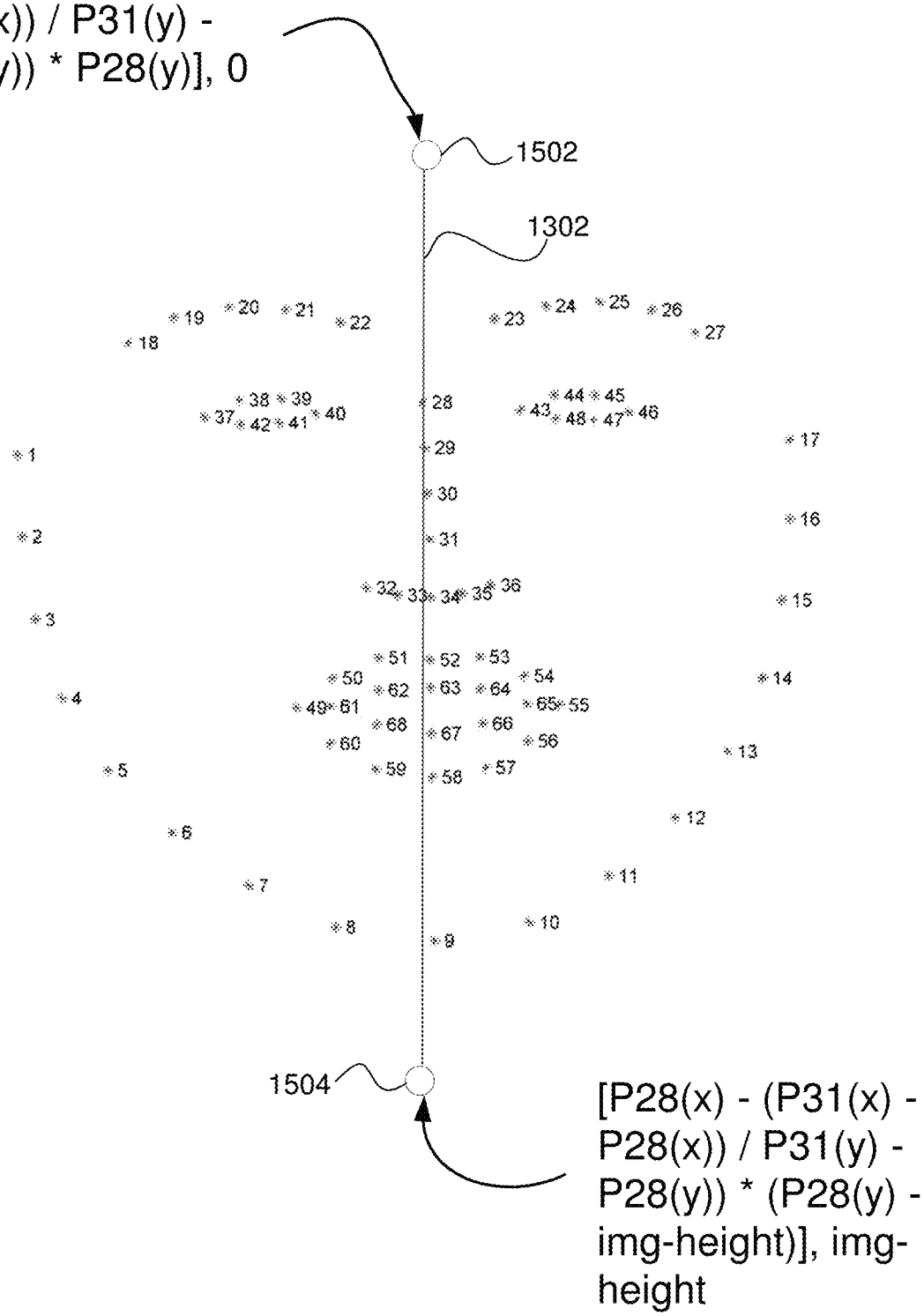
FIG. 15 illustrates a method for generating a vertical facial line in accordance with an embodiment of the present disclosure.
Figure 16:
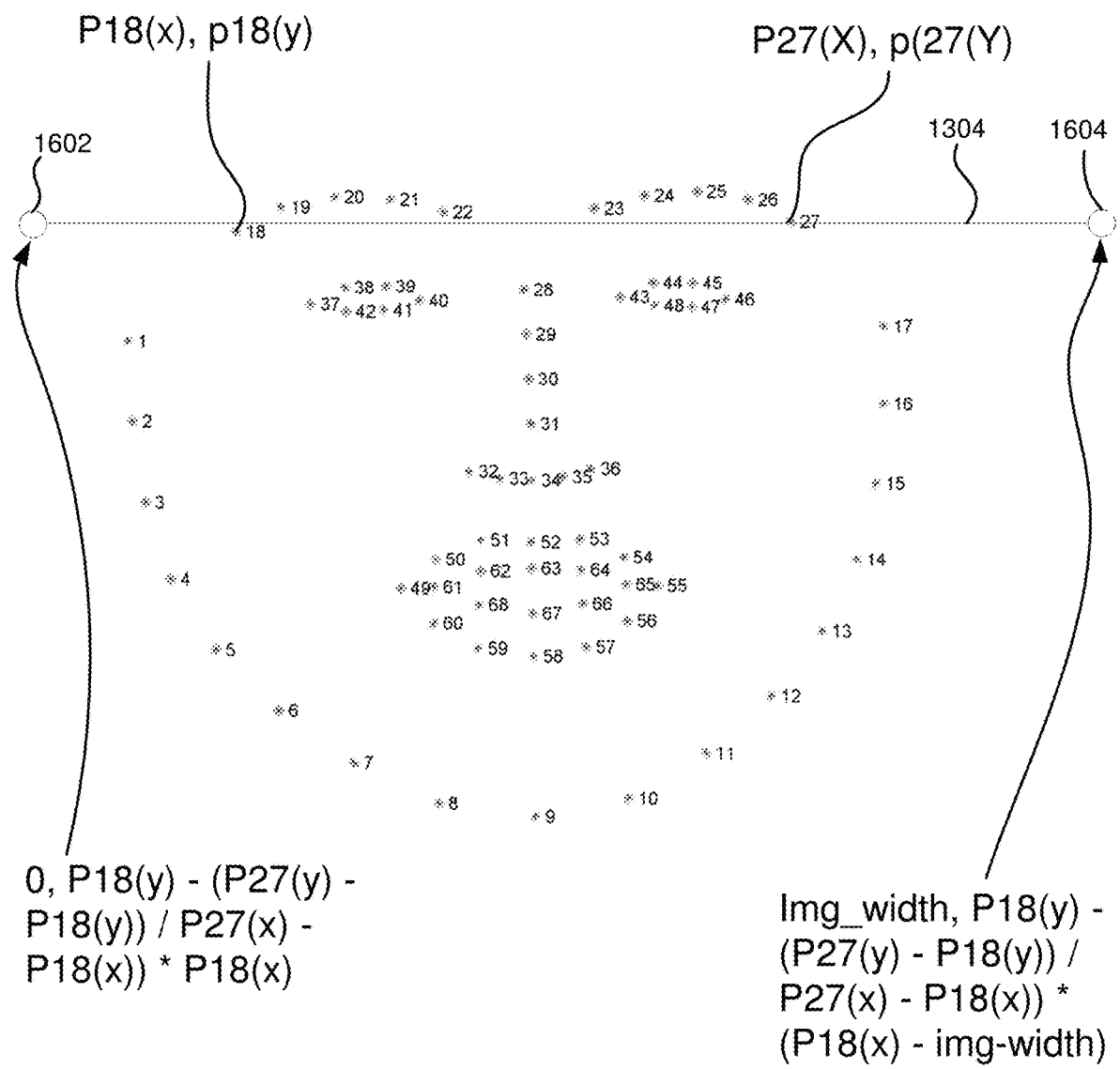
FIG. 16 illustrates a method for generating an upper horizontal facial line in accordance with an embodiment of the present disclosure.
Figure 17:
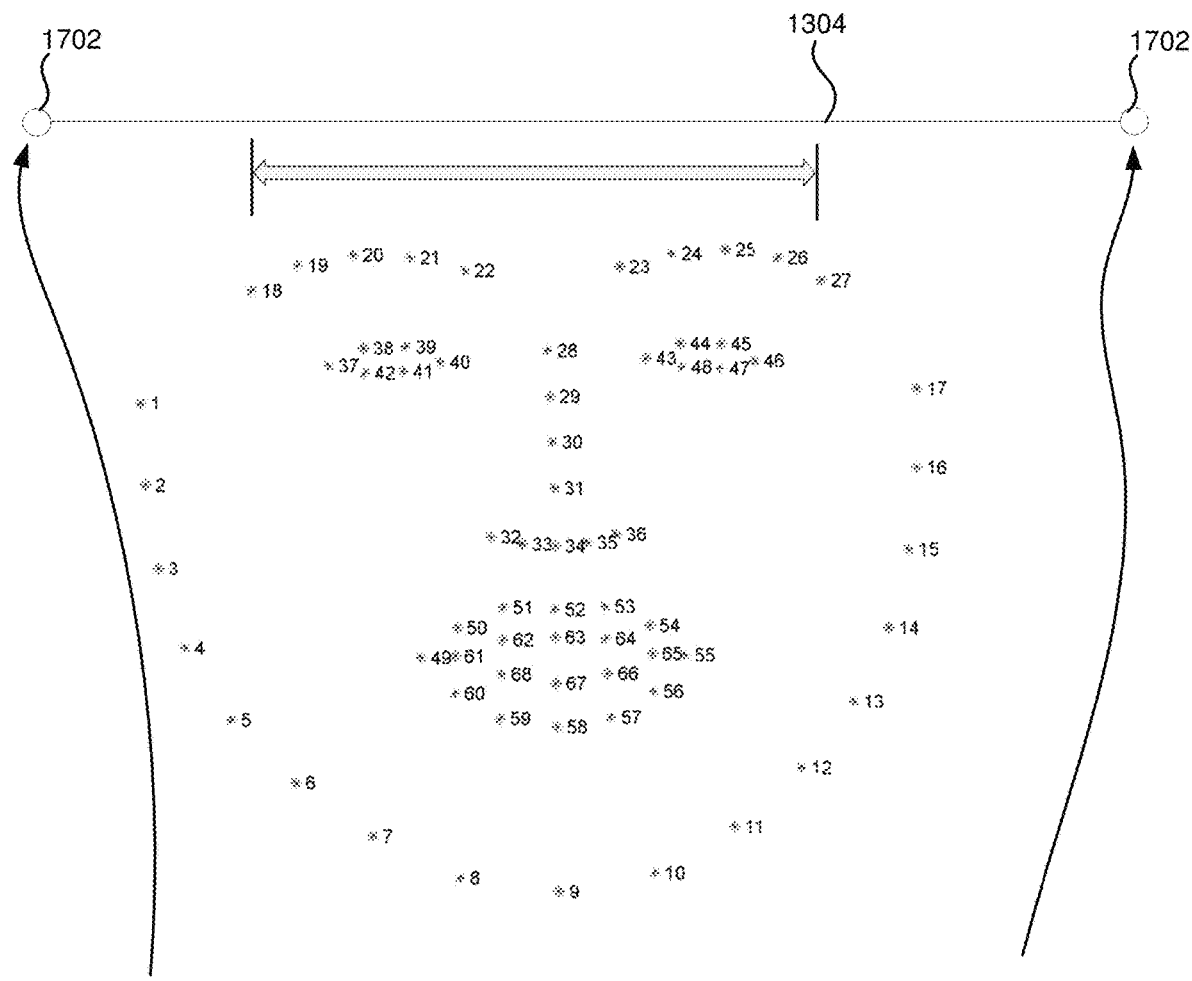
FIG. 17 illustrates movement of an upper horizontal facial line by a user-defined value in accordance with an embodiment of the present disclosure.

"*" means multiply
"−" means minus
"x, y" order within which the coordinates are specified Initially, a convolutional neural network is employed to detect facial key points of a face in an image, e.g., points 1-68 shown in FIG. 13. It is to be appreciated that the facial key points may be used to draw or generate reference lines on the image, for example, a virtual headband. Next, a line 1302 perpendicular to the face is drawn using key points 28, 29, 30 and 31 on a nose of the head, i.e., points 28, 29 30 and 31 are disposed vertically along a nose of the head. Referring to FIG. 15, this line 1302 is extended vertically to the end of the frame of the image, where endpoints 1502 and 1504 are defined by the parameters shown in FIG. 15. It is to be appreciated that line 1302, shown FIGS. 13 and 15, is facial vertical line 2 shown in FIG. 1. Next, a line 1304 horizontal to the face between key points 18 and 27 is drawn, i.e., 18 and 27 points are approximately on the ends of a brow line of a face. Referring to FIG. 16, this line 1304 is extended horizontally to the end of the frame of the image, where endpoints 1602 and 1604 are defined by the parameters shown in FIG. 16. It is to be appreciated that line 1304, shown in FIGS. 13 and 16, is upper facial horizontal line 3 shown in FIG. 1. Referring to FIG. 17, line 1304 may be shifted upward by a user-defined value, e.g., an alpha value, so line 1304 may be aligned with a head gear, as will be explained in more detail below.

A line perpendicular 1306 to the camera and a line horizontal 1308 to the camera making reference coordinates is drawn which always passes from the point of intersection between upper face horizontal line 1304 and upper face vertical line 1302. It is to be appreciated that line 1306 is screen vertical line 1 and line 1308 is upper screen horizontal line 4 shown in FIG. 1. This intersection point is approximately on the center of the forehead. Using these four lines, the roll angle and the yaw angle of the face in the image frame can be calculated. For example, yaw angle may be determined from line 1302 and 1306 and roll angle may be determined from line 1304 and 1308, as shown in FIG. 13.

Figure 18:
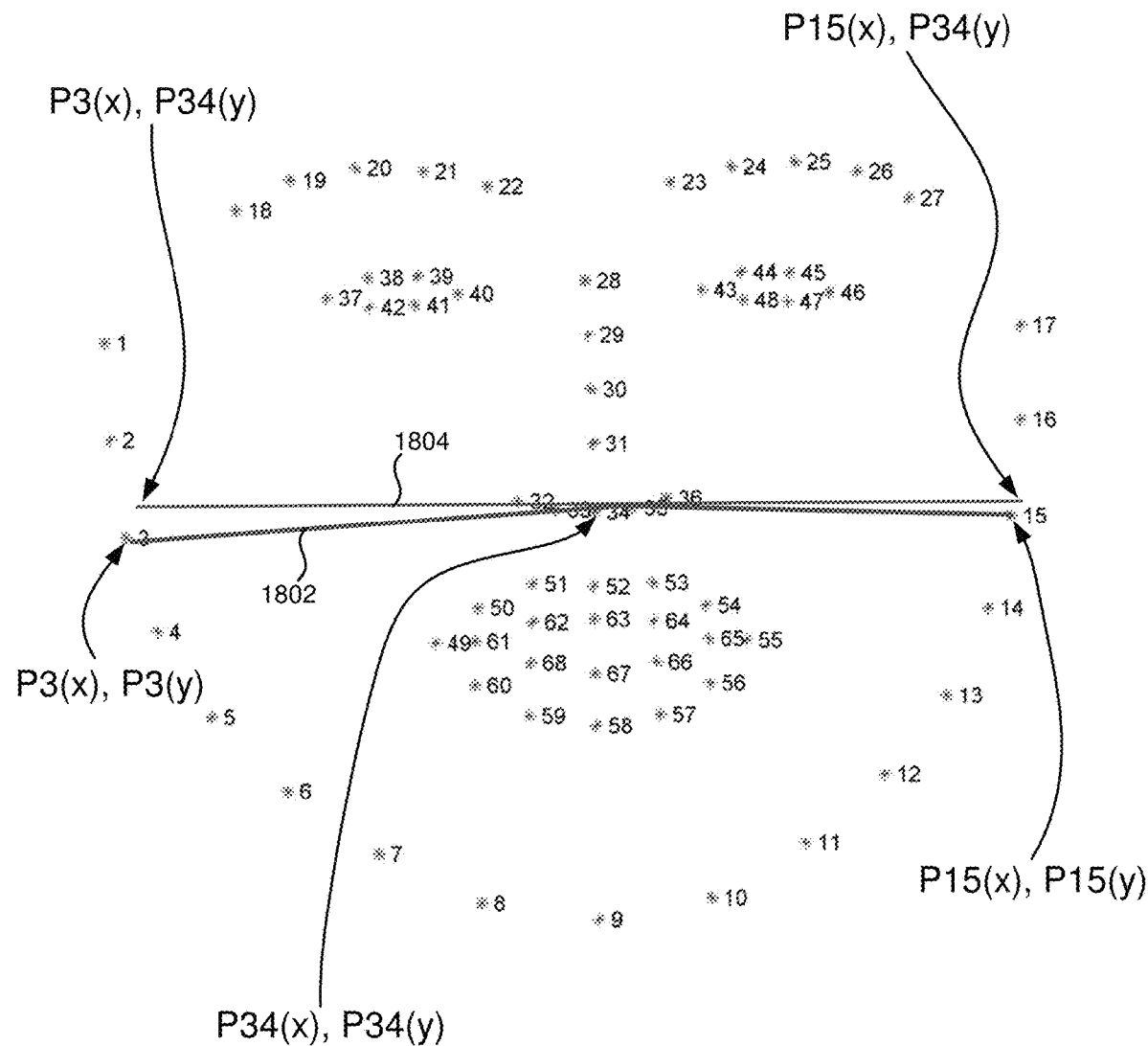
FIG. 18 illustrates a method for generating a lower horizontal facial line or pitch line in accordance with an embodiment of the present disclosure.

As the pitch angle is captured by motion in the third axis (i.e., depth) which can not directly be calculated by a simple two-dimensional (2D) camera, an adjustment is employed to calculate pitch. First, a line 1802 is drawn between the points 3, 34 and 34,15, and then, a line 1804 horizontal between the points 3, 15 is also drawn, as shown in FIG. 18. It is to be appreciated that points 3 and 15 are disposed on a perimeter of the face and point 34 is approximately disposed at a tip of the nose. It is further to be appreciated that points 1 through 17 define a portion of the perimeter of the face and points 32 through 36 define a lower portion of the nose. In some face shapes, when pitch is zero, these two lines 1802 and 1804 should be completely parallel to each other. And as the face moves up and down, the tip of the nose moves and the pitch angle between line 3,34,15 and line 3, 15 can be calculated. However, in most of faces due to their facial architecture, the initial angle at zero pitch may not be zero and the initial angle needs to be normalized.

Figure 19:
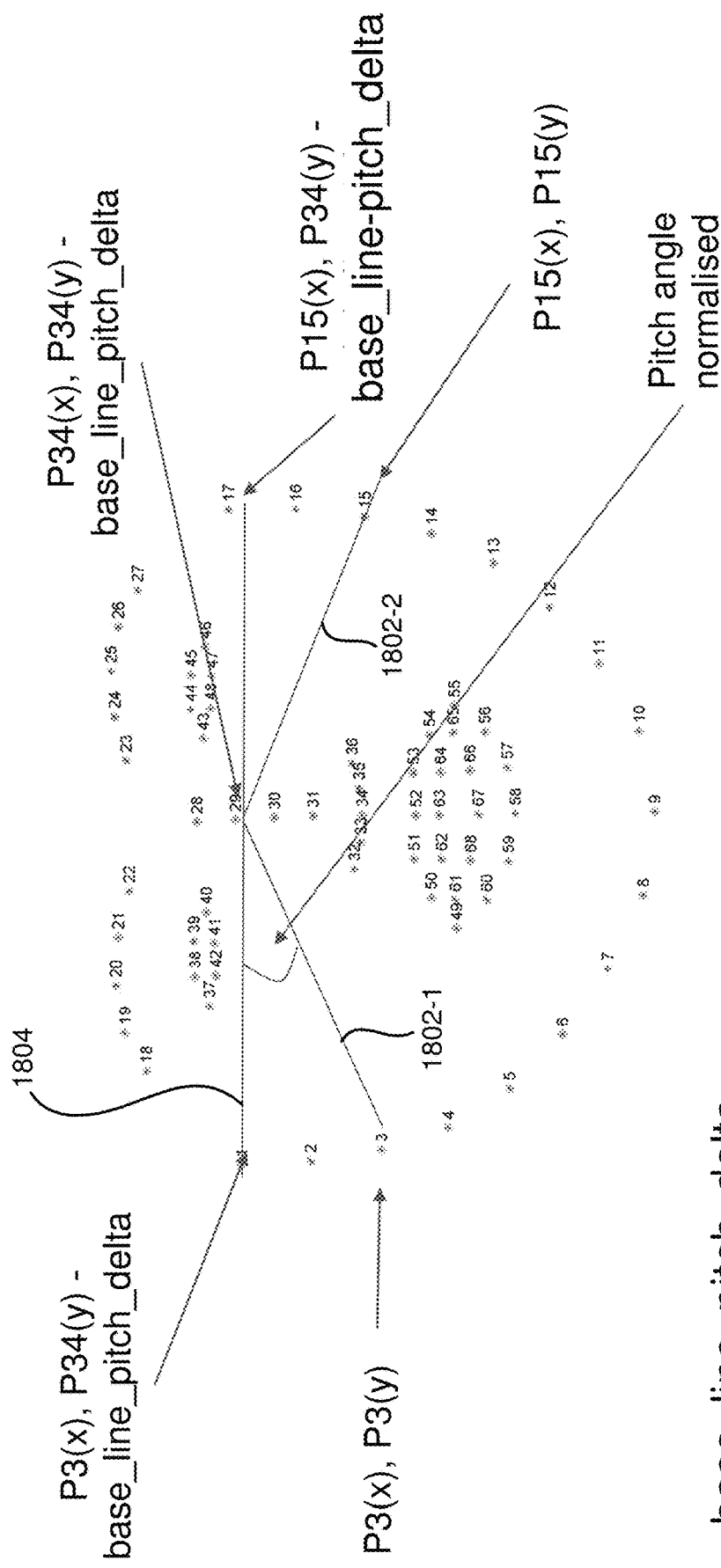
FIG. 19 illustrates a method for normalizing the lower horizontal facial line or pitch line shown in FIG. 18 in accordance with an embodiment of the present disclosure.

So when a patient's head is rested on a head holder with zero pitch and an input device such as keyboard 1110 is activated, the system calculates a pitch normalization delta value (also known as the base line pitch delta as shown in FIG. 19) and calculates a reshuffled point instead of 34, (for example, slightly above point 34 in most cases). Let us call this shifted point as 34'. Now the angle between 3-34'-15 and 3-15 may provide the pitch angle for any face just by using a 2D camera.

Pitch cannot directly be calculated using a camera because pitch is in the depth direction. To resolve this problem, the pitch is adjusted or normalized. It can be seen that when one moves their head in pitch direction, point 34 will move more as compared to point 3 and 15. Thus the angle drawn between point 3, 34 and 15 should change if pitch changes. This angle is not necessarily zero when the pitch is zero. That's why the operator needs to rest the patient's head on a head holder when the operator believes, or knows, the pitch is at zero and presses a button P on the keyboard to record it. Once the button P is pressed there is a shift in Y coordinate of point 34 calculated as Pitch norm delta is the value P34(y)−(P3(y)+P15(y))/2 calculated at that frame at which the operator recorded the zero pitch. By subtracting this quantity from P34(y), the angle drawn to zero is normalized. Referring to FIG. 19, line 1804 is normalized by shifting upwards by the base line pitch delta value. The pitch angle may be calculated as the angle between line 1804 and 1802-1 or 1802-2.

It is to be appreciated that these lines will be used in further steps to assist in moving the head to any desired positioning with or without headgear. For example, the lines are used to control rotations in different directions such as Screen Vertical Line 1 and Facial Vertical Line 2 to control Yaw; Upper Screen Horizontal Line 4 and Upper Facial Horizontal Line 3 to control Roll; Lower Screen Horizontal Line 5 and Lower Facial Horizontal Line 6 forming Pitch Line to control Pitch, where Rotation around the Z-axis (sagittal) is called roll.
Rotation around the X-axis is called pitch.
Rotation around the vertical Y-axis is called yaw.

The operator will be able to adjust the height of the Upper Screen Horizontal Line 5 (if required) by shifting the line upward or downward.

Figure 8:
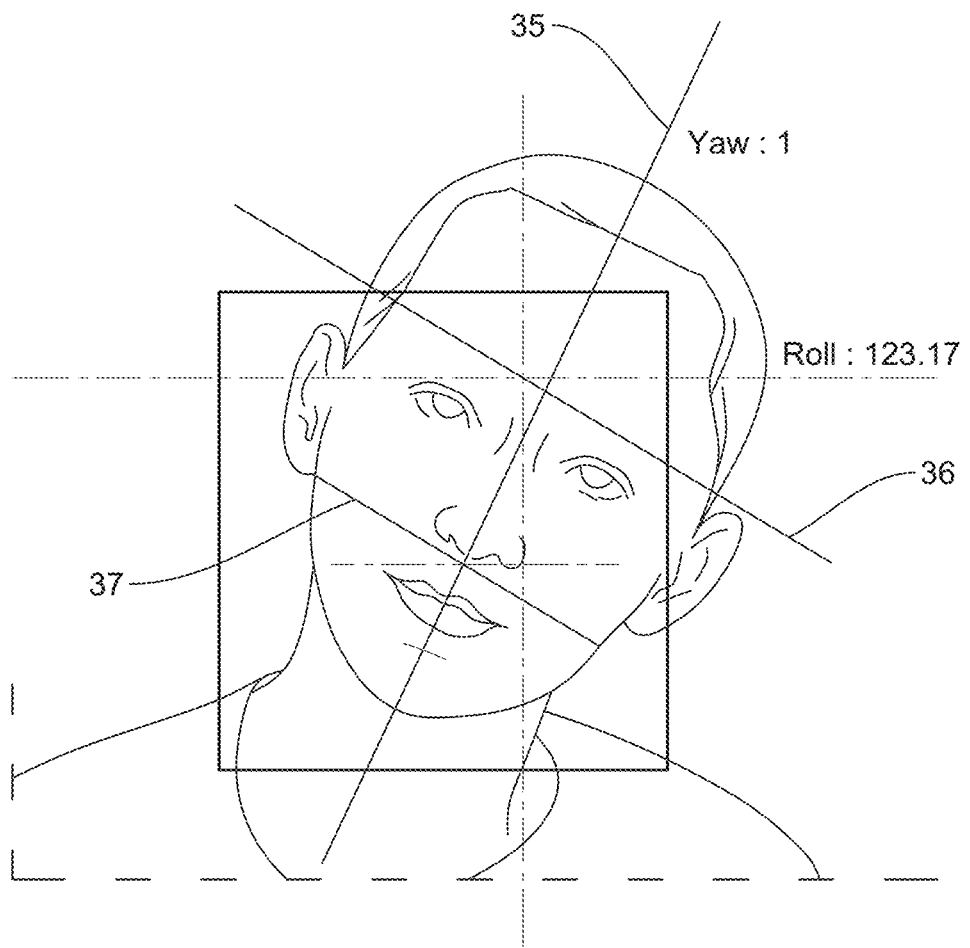
FIG. 8 illustrates correct lateral movement of a head to the left before mouth opening in accordance with an embodiment of the present disclosure.

In one example, as shown in FIG. 5, the system and method of the present disclosure may be used to align a human head in a 90 degree alignment with the imaging device. As shown in FIG. 5, the default pitch line 24 is broken into two segments since the head is not aligned according to the prerecorded pitch. The subject is then instructed to move their head until the pitch lines 24 are coincided with zero pitch line 23. Additionally, once a head is repositioned, the system and method may be employed to ensure that the head is at zero pitch, for example, as shown in FIG. 8. In FIG. 8, the pitch line 37 is parallel to line 36 and perpendicular to vertical line 35.

Furthermore, the coordinates of a particular position may be stored to reposition the head in the same position at a later time. For example, in FIG. 8, the coordinates for the position shown may be stored as yaw:1, roll:123.17 and pitch:0 at a first point in time (e.g., at an initial visit to a doctor). Then, later at a second point in time (e.g., a subsequent visit to a doctor), the head may be repositioned to the exact coordinates by retrieving the coordinates and displaying the retrieve coordinates on a display device. The patient may then be instructed by an operator to move their head until the head aligns with the stored positions. In one embodiment, the recorded lines may be displayed on the display device. Next, the system will generate the facial lines based on the identified facial points. As the facial lines approach the recorded lines, the system may produce a sound with a pitch that changes as the lines converge and then give an indication when the lines match.

In one embodiment, the system 1100 may include multiple imaging devices arranged in a variety of ways. For example, the imaging device may be arranged in a circular manner around the head to capture the movement of the head in 360 degrees relative to a starting or initial position. In this embodiment, as long as the image of the face is within a frame of the imaging device the particular imaging device will be active. As the subject rotates their head, an adjacent imaging device will become active when the imaging device detects that the face is within a frame of that particular imaging device. It is to be appreciated that the multiple imaging devices may be arranged in any manner to capture a full range of motion of the subject, for example, multiple imaging devices arranged in a spherical relationship.

Now, a method of controlling movement of a human head in respect to the lines to register head's positioning for Headgear Sensor positioning with minimal distortion and to avoid any error in repositioning will be described. Referring to FIG. 2, the operator coincides Screen Vertical Line 1 and Facial Vertical Line 2 to form one single line, the Single Vertical Line 7, and coincides Upper Screen Horizontal Line 4 and Upper Facial Horizontal Line 3 to form one single line, the Upper Single Horizontal Line 8, and, the operator coincides Lower Screen Horizontal Line 5 and Lower Facial Horizontal Line 6 to form Lower Single Horizontal Line 9. Next, satisfy pitch position angle of the head with acceptable to the operator means (either with help of electronic sensors affixed on the headgear with the help of a facial clamp, pixel data, or otherwise) and provide an input the computing device 1106 to Record Zero Pitch Angle and create the Default Pitch Line 9 once the head's pitch is satisfactory. Once the Default Pitch Line 9 is recorded, the Default Pitch Line 9 coincides with Lower Single Horizontal Line, and at the repeat position, must coincide the same way in a pure linear fashion. At this time the operator is ready to position the headgear according to the rules, which will be described below in relation to FIG. 7.

Headgear's Reinsertion and Rules

The Upper Single Horizontal Line 8 positioning on the forehead is known when a headgear is inserted, or reinserted, on a human head. This is the line where Headgear Edge 11 has to be coincided. The Alpha Value is specific for each individual and is one among at least two necessary components for positioning and repositioning of the headgear sensor device with the purpose of defining the border for the headgear. The Alpha value can be changed (i.e., moved) up or down for convenience in case if positioning of the headgear 1104 needs to be positioned in a more convenient location. That is, an operator may enter the alpha value to move Upper Single Horizontal Line 8 up or down on the display device in relation to the face, and then, the head gear is positioned on the head so the edge 11 of the head gear coincides with the Upper Single Horizontal Line 8. The Center of the Headgear 10 must be coincided with the Single Vertical Line 7.

The head is positioned in the head holder 1105 in front of the imaging device 1102. Where the lower jaw is fully engaged within the Head Holder's Horizontal Shelf 12 on the Chin Rest 13. Once the head is placed on the Horizontal Shelf 12 of the Head Holder 1105, the face image will appear on display device 1108 as shown in FIG. 5. As shown in FIG. 5, all of the following lines are to be realigned: Upper Facial Horizontal Line 21, Upper Screen Horizontal Line 22, Lower Screen Horizontal Line 23, Zero Pitch Angle/Default Pitch Line 24, Screen Vertical Line 25 and 26 is Facial Vertical Line 26.

Next, the person is instructed to move his head such that on the computer screen the Single Vertical Line 27, Single Screen Horizontal Line 28 and Lower Facial Horizontal Line 29 coincided together with the original Default Pitch Line with the Zero Pitch Angle recorded prior. The facial markings help to follow the face to this prior recorded default position with the facial lines which must coincide according to the rules to reposition the face, and, as a consequence, head into its original position, as shown in FIG. 6.

Figure 7:
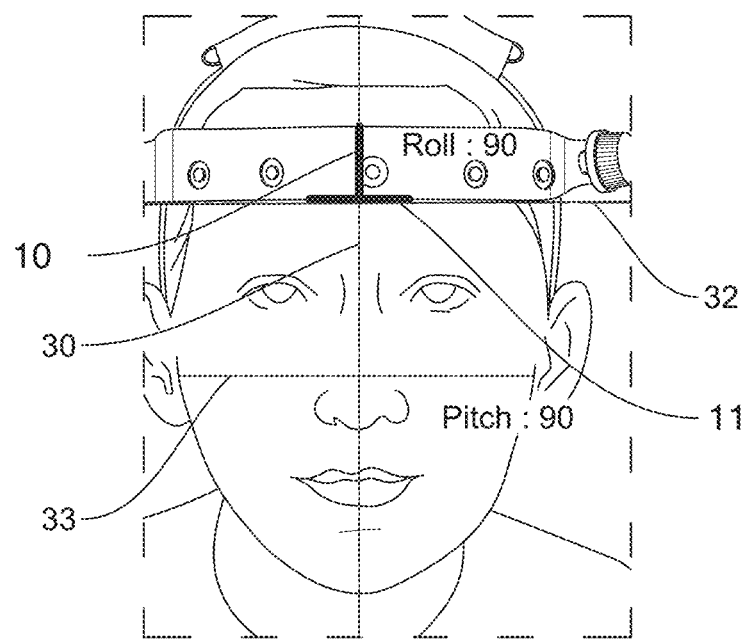
FIG. 7 illustrates repositioning of headgear with a normalized pitch angle in accordance with an embodiment of the present disclosure.

When all screen lines are as above, the Headgear is positioned on the head and the Headgear Edge 11 is aligned with the Single Horizontal Line 32 and Headgear Center 10 is aligned with the Single Vertical Line 30, while Zero Pitch Angle Line coincides with Default Pitch Line 33, as shown in FIG. 7. At this time, the headgear 1105 can be locked in place.

Since the Alpha or control value may adjust the Upper (both Screen and Facial) Horizontal Line 8 up and/or down, any headgear, or facial system, can be used to be synchronized to the system of the present disclosure and enabling the method and system of the present disclosure to be very cost effective and universal.

The method described herein is used when precise and controlled head's positioning with or without positioning sensors is necessary, for example, during bloodless stereotactic brain surgery treatments, or during imaging procedures requiring certain precise positioning. It is far more precise than a mechanical clamp method because conventional mechanical clamp systems do not compensate for minute movement of the head and therefore the method of the present disclosure is more safer, predictable and controllable. The method also can be used to control object positioning for the purpose to control angular image distortion in any type of images of head and neck using the identified lines, or with a help of a headgear positioned as described with an electronic 3-axial sensor which would control roll, yaw and pitch.

Correct Lateral Movement to the Left Before Mouth Opening

In the neck, Lateral Side Bent Open Mouth view images are utilized for the purposes to assess damages to Cervico-cranial supportive ligaments and, for example, to diagnose instability in the Cervicocranium. As the Atlanto-Axial joint is a pure rotational joint, any rotation in that joint during an imaging procedure would be translated with some degree of image angular distortion. Utilizing the method of the present disclosure respective to the open mouth imaging with lateral side bend open mouth view, the Default Pitch Line 37 must be kept parallel to the Upper Facial Horizontal Line 36, and angle between Facial Vertical Line 35 and Default Pitch Line 37 and Upper Facial Horizontal Line 36 must be kept strictly at 90 Degrees, as shown in FIG. 8. Open Mouth Lateral Side Bent Neck Image positions are very difficult to control especially when precise Cervicocranial images are to be taken with control of rotations in the C1/C2 vertebrae joint. If these rotations are introduced into the imaging because of lack of controlled positioning, different multiple outcomes may be seen on the images. Moreover, every image taken of the Cervicocranium on the same patient without positioning control will be different. As well, control of the Pitch is important because the image of the Palatal Shelf and Occiput can overlap on the image of C1-C2 vertebrae during open mouth views. Precise repositioning of the patient to retake the images of the Cervicocranium to assess treatment, or progress of a disease can also be done with the use of the method of the present disclosure.

Figure 9:
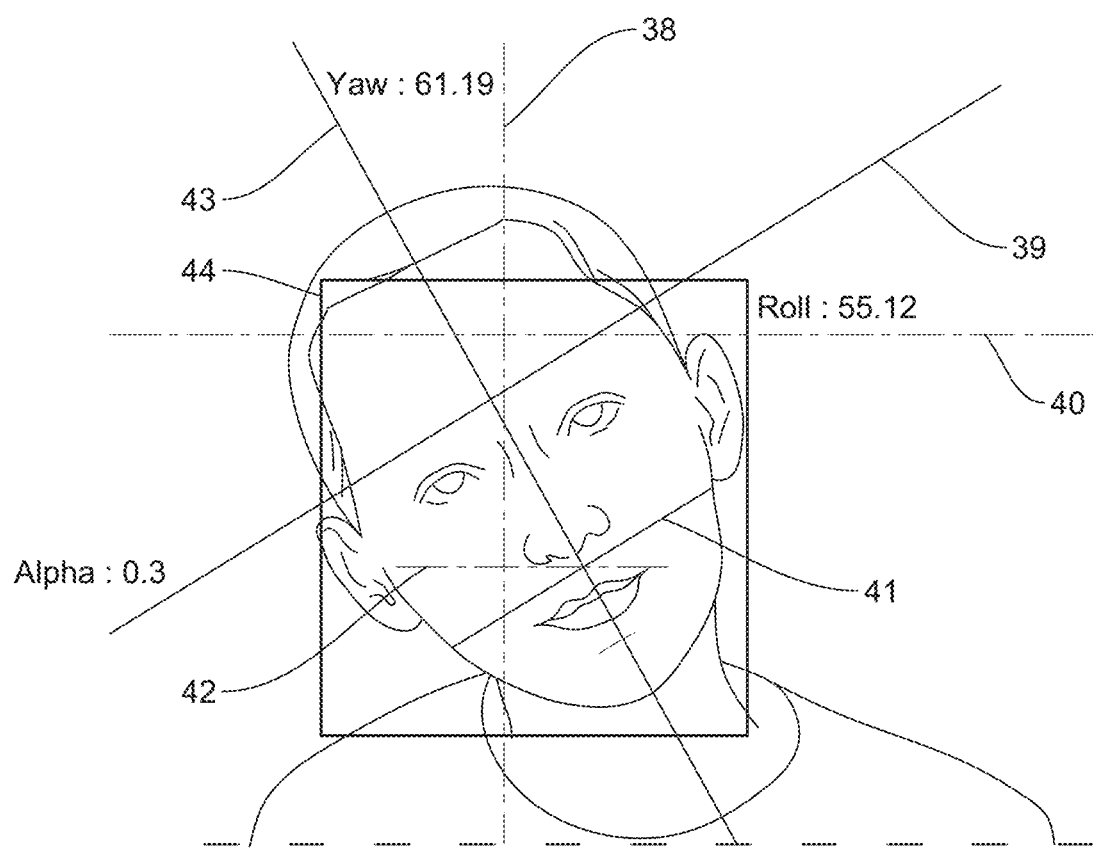
FIG. 9 illustrates correct lateral movement of a head to the right before mouth opening in accordance with an embodiment of the present disclosure.

Referring to FIG. 9, to correct for lateral movement to the right side before opening the mouth, the Default Pitch Line 41 must be kept parallel to the Upper Facial Horizontal Line 39, and the angle between Facial Vertical Line 43 and Default Pitch Line 41 and Upper Facial Horizontal Line 39 must be kept strictly at 90 degrees.

Figure 10:
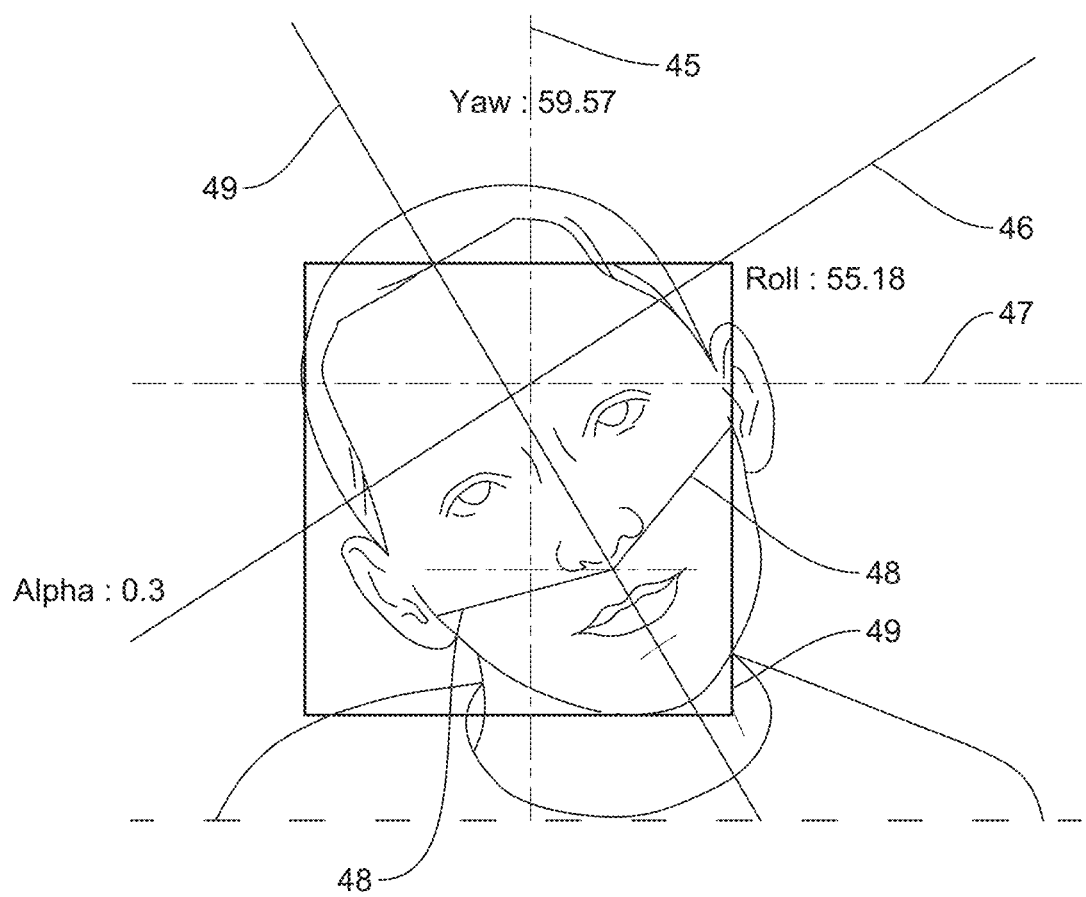
FIG. 10 illustrates deviation in pitch between generated lines and head position in accordance with an embodiment of the present disclosure.

Referring to FIG. 10, pitch deviation relative to FIG. 9 can be seen by noting the Default Pitch Line 48 is not parallel to the Upper Facial Horizontal Line 46. Additionally, the angles between Facial Vertical Line 49 and Default Pitch Line 48 are not at 90 degrees and Default Pitch Line 48 and Upper Facial Horizontal Line 46 are not parallel. For the deviation to be corrected, the operator would need to instruct the subject to move his head until the Default Pitch Line 48 is parallel to Upper Facial Horizontal Line 46, and the Default Pitch Line 48 is perpendicular to Facial Vertical Line 49.

The method of the present disclosure may be utilized for controllable movement of the head side to side without any headgear or sensors, see FIGS. 8-10 which do not show the headgear. The significance of FIGS. 8-10 is that the method does not need any additional hardware for controllable positioning for the purpose of diagnostic imaging procedures of the Atlanto-Axial Joint in Cervicocranial side bending open mouth images. Cervicocranium is the area extending from Occiput, C1 and C2 and is considered the most difficult area to be imaged and analyzed, and that is why lateral bending positioning with open mouth views to diagnose injuries, for example, are significantly underutilized. Therefore, diagnostic radiology is presently very limited. The method of the present disclosure is a problem-solving method for medical diagnostic imaging in this anatomy.

Another significance is that stereotactic surgery can be performed without headgear positioning sensors. As described in relation to FIGS. 13 and 14, pixel data is precise enough to position the head in the desired positioning. Imaging of brain is a complex procedure which requires a lot of electronic and electrical equipment. All electronic and electrical equipment create a magnetic field which will distort other closely located 3 axial positioning sensors. The use of pixel data to position the head according to the facial markings is a significant step to avoid the use of positioning electronics which may malfunction in, or around a magnetic field of MRI, CT, PET or X-ray equipment, or electrical wiring.

Flexion and Extension, Side Bending diagnostic imaging of the neck can also be performed without sensors based on the facial lines, or with the headgear sensors which are positioned as described.

Programming Secondary Sensors

Once the Roll, Yaw and Default Pitch Line Angle position is established and recorded, as shown in FIG. 6, the data can be transferred to any other sensor as many times as needed as long as the face is positioned within the original computer frame. This position may be duplicated, or transferred to another sensor anywhere in the body and use this position further when any angular controlled positioning is required.

For example, an intraoral sensor fork with a moldable dental impression material can be inserted into the patient's mouth and the patient would close his mouth on the sensor fork with the material. The material is molded around the teeth to create interlocking while the Vinyl Polysiloxane Impression (VPS) dental material sets creating customized fork on teeth. The fork has an electronic 3-axial sensor on the outside of the mouth rigidly attached on the fork. Programming of the sensor is done at the moment when the Default Pitch Line Angle position is recorded. Alternatively, these coordinates may be used, or transferred with a Bluetooth™ connection to a sensor located on the spine if we want to control a pure orthogonal patient's positioning during an imaging of spine. Multitude of use is endless.

Additionally, if the positioning of the face and anatomical topography of other organs or other portions of the body are known, these other organs or portions may be positioned without secondary sensors. In this embodiment, the method establishes a coordinate relationship between the face and at least one other portion of the body (e.g., an organ) and positions the at least one other portion of the body to a predetermined position by repositioning the human head and/or face. For example, it is known that lateral orthogonal imaging of the spine is perpendicular to the anterior (frontal) orthogonal imaging of the face. If we program facial orthogonal positioning towards the unit with a camera device, or unit representing a camera device, then, lateral orthogonal imaging of the spine will be the positioning minus 90 degree to the facial positioning. We just rotate the patient 90 degrees towards the imaging source that is located 90 degree opposite to the imaging device with a camera imaging orthogonal positioning of the face. With programming the secondary devices, we need to know anatomical relationship of the human face towards the anatomy. As an example, lateral orthogonal images of spine are taken perpendicular to the face. With secondary sensors, the method and system of the present disclosure can image anything in any controlled positioning and reposition that part of the body in the same positioning at a later time. As another example, we know the exact location of the face towards the camera device, and we have a location sensor on a wrist programmed at the time when we have saved the pitch angle data. That wrist sensor has XYZ coordinates saved in relation to the facial location. We can position the wrist into the same XYZ coordinates provided that the wrist sensor can be relocated precisely with, or on the wrist. This is the law of relativity.

The Alfa or control value is a unique control value for each individual face that works without respect to the distance between the face and the image capture device, e.g., a camera device. Therefore, during repeating positioning of the headgear device, e.g., headgear device 1104, the Alfa value will allow positioning of the headgear to the exact same location it was positioned first time without regard to the distance between the face and the image capture or camera device.

Another use for the system and method of the present disclosure is for aiming purposes in the air force during "dog fighting", or in video games, for diagnostic measurement of neck range of motion devices, or games that promote neck physical exercises and mobility.

The devices, systems and methods of the present disclosure may be employed for the following use cases: positioning of human body with a certain positioning next to a computer for proper posture; physical medicine and rehabilitation testing for range of motion of neck measurement; physical exercises and games; various Cervicocranial, cervical and spinal imaging that requires control of positioning; control of head's positioning during diagnosis and treatment of brain lesions with use of stereotactic brain surgery; aiming devices used in a military; positioning of the patient before and during various imaging of head, neck and spine when control of image angular distortion is important, or with use of certain positioning protocols.

Figure 12:
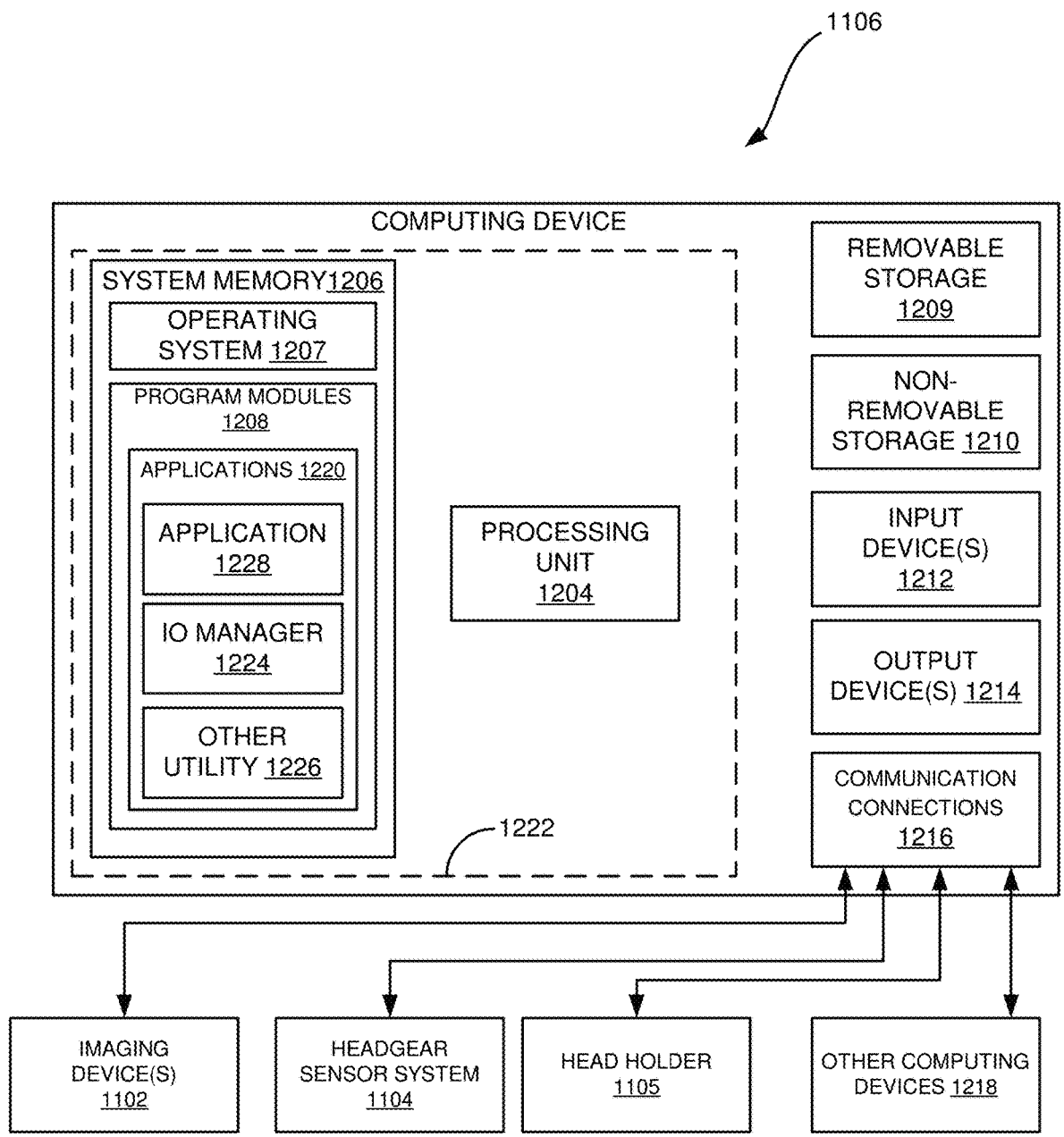
FIG. 12 is a block diagram of an exemplary computing device in accordance with an embodiment of the present disclosure.

FIG. 12 is a block diagram illustrating physical components of a computing device 1106, for example, a client computing device, a server, or any other computing device, with which examples of the present disclosure may be practiced. In a basic configuration, the computing device 1106 may include at least one processing unit 1204 and a system memory 1206. Depending on the configuration and type of computing device, the system memory 1206 may comprise, but is not limited to, volatile storage (e.g., random access memory), non-volatile storage (e.g., read-only memory), flash memory, or any combination of such memories. The system memory 1206 may include an operating system 1207 and one or more program modules 1208 suitable for running software programs/modules 1220 such as IO manager 1224, other utility 1226 and application 1228. As examples, system memory 1206 may store instructions for execution. Other examples of system memory 1206 may store data associated with applications. The operating system 1207, for example, may be suitable for controlling the operation of the computing device 1106. Furthermore, examples of the present disclosure may be practiced in conjunction with a graphics library, other operating systems, or any other application program and is not limited to any particular application or system. This basic configuration is illustrated in FIG. 12 by those components within a dashed line 1222. The computing device 1106 may have additional features or functionality. For example, the computing device 1106 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1206. While executing on the processing unit 1204, program modules 1208 (e.g., Input/Output (I/O) manager 1224, other utility 1226 and application 1228) may perform processes including, but not limited to, one or more of the stages of the operations described throughout this disclosure. For example, one such application 1228 may implement the facial recognition software described in relation to FIGS. 1-10 and the facial points mapping software described in relation to FIGS. 13-14. Other program modules that may be used in accordance with examples of the present disclosure may include electronic mail and contacts applications, word processing applications, spreadsheet applications, database applications, slide presentation applications, drawing or computer-aided application programs, photo editing applications, authoring applications, etc. It is to be appreciated that several modules or applications 1228 may be execute simultaneously or near simultaneously and may share data.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 1106 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the present disclosure may be practiced within a general purpose computer or in any other circuits or systems.

The computing device 1106 may also have one or more input device(s) 1212 such as a keyboard, a mouse, a pen, a sound input device, a device for voice input/recognition, a touch input device, etc. The output device(s) 1214 such as a display, speakers, a printer, etc. may also be included. The aforementioned devices are examples and others may be used. The computing device 1106 may include one or more communication connections 1216 allowing communications with other computing devices 918 (e.g., external servers) and/or other devices of the positioning system such as imaging device 1102, headgear sensor system 1104 and head holder 1105. Examples of suitable communication connections 1216 include, but are not limited to, a network interface card; RF transmitter, receiver, and/or transceiver circuitry; universal serial bus (USB), parallel, and/or serial ports; and/or wireless transceiver operating in accordance with, but not limited to, WIFI protocol, Bluetooth protocol, mesh-enabled protocol, etc.

The term computer readable media as used herein may include computer storage media. Computer storage media may include volatile and nonvolatile, removable and non-removable media implemented in any method or technology for storage of information, such as computer readable instructions, data structures, or program modules. The system memory 1206, the removable storage device 1209, and the non-removable storage device 1210 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1202. Any such computer storage media may be part of the computing device 1202. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is to be appreciated that the various features shown and described are interchangeable, that is a feature shown in one embodiment may be incorporated into another embodiment. It is further to be appreciated that the methods, functions, algorithms, etc. described above may be implemented by any single device and/or combinations of devices forming a system, including but not limited to meters, IEDs, servers, storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One may implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A computer-implemented head-positioning method comprising:
   imaging a face of a human head with at least one imaging device;
   generating, via a processing device, at least one vertical facial line and at least two horizontal facial lines to be disposed on the image of the face, the at least one vertical facial line and the at least two horizontal facial lines generated based on facial markings of the face detected by a facial recognition application;
   displaying the overlaid image with the generated facial lines on a display device;
   aligning the human head, based on the disposed image, such that the at least one vertical facial line is aligned with a generated vertical screen line and each of the at least two horizontal facial lines are aligned with a generated horizontal screen line on the display device, wherein the alignment is guided by the display device and the generated vertical and horizontal screen lines represent a 90 degrees face to imaging device positioning;
   storing, in a memory device, the alignment as a baseline configuration, wherein a lower line of the aligned at least two horizontal facial lines and generated horizontal screen lines is stored as a default pitch line;
   repositioning the human head to a desired position by laterally the human head around the sagittal axis of rotation to at least one side, wherein upon repositioning, the processing device continuously updates the alignment of the at least one vertical facial line and the at least two horizontal facial lines on the display device based on the detected facial markings of the face; and
   realigning the human head at the desired position such that the default pitch line is represented by a continuous line and is parallel to an upper line of the at least two horizontal facial lines and the default pitch line, the upper horizontal facial line are perpendicular to the at least one vertical facial line, and at least one vertical facial line coincides with at least one vertical screen line, whereby an image taken at the desired position is taken orthogonally in relation to a point of sagittal axis of rotation, has no image angular distortion, and has no image angular distortion relative to an image of the same anatomy taken at the baseline position.

2. The method of claim 1, wherein the facial markings on the human head are identified as key points, and the key points are connected to draw the at least one vertical facial line and the at least two horizontal facial lines.

3. The method of claim 2, wherein the at least one vertical facial line is drawn connecting identified facial markings disposed vertically along a center of a nose of the face.

4. The method of claim 3, wherein a yaw angle of the human head is determined from the at least one vertical facial line and the generated vertical screen line.

5. The method of claim 2, wherein an upper of the at least two horizontal facial lines is drawn connecting identified facial markings disposed at opposite ends of a brow line of the face.

6. The method of claim 5, wherein a roll angle of the human head is determined from the upper of the at least two horizontal facial lines and the generated horizontal screen line.

7. The method of claim 1, wherein the at least one facial recognition application includes a convolutional neural network.

8. The method of claim 1, wherein the default pitch line is broken into two segments at the at least one vertical facial line.

9. The method of claim 8, wherein the aligning the human head includes aligning the two segments of the default pitch line to be parallel to an upper line of the two horizontal facial lines.

10. The method of claim 9, wherein each segment of the two segments of the default pitch line is drawn connecting identified facial markings disposed at a tip of a nose of the face and at least one point on a perimeter of the face.

11. The method of claim 8, wherein a pitch angle is determined as the angle between the default pitch line and one of the two segments.

12. The method of claim 1, wherein the default pitch line is normalized to compensate for differences of facial architecture of the human head.

13. The method of claim 1, further comprising storing coordinates associated to the alignment of the repositioned human head at a first point in time and repositioning the human head according to the stored coordinates at a second point in time.

14. The method of claim 1, further comprising:
disposing a head gear on the human head, the head gear including a center marking indicating the center of the head gear and an edge marking;
aligning the center marking of the head gear to the least one aligned vertical line;
aligning the edge marking of the head gear to at least one of the aligned horizontal lines; and
storing the alignment of the head gear to the human head.

15. The method of claim 14, further comprising:
repositioning the head gear on the human head; and
aligning the at least one of the aligned horizontal lines to the edge marking of the head gear by entering a control value to shift the at least one of the aligned horizontal lines, wherein the repositioned head gear matches the stored alignment without regard to a distance between the face and imaging device.

16. The method of claim 1, further comprising storing coordinates associated to the alignment of the repositioned human head at a first point in time and transferring the stored coordinates to at least one sensor coupled to at least one body part.

17. The method of claim 1, further comprising:
establishing a coordinate relationship between the face and at least one other portion of the body; and
positioning the at least one other portion of the body to a predetermined position by repositioning the human head.

18. The method of claim 1, wherein the default pitch line is broken into two segments at the at least one vertical facial line, each segment of the two segments of the default pitch line is drawn connecting identified facial markings disposed on a nose and at least one point on a perimeter of the face.

19. The method of claim 18, wherein the realigning the human head includes aligning the two segments of the default pitch line to be parallel to the upper horizontal facial line.

20. The method of claim 1, wherein the human head is rotated around the sagittal axis of rotation around the tip of the nose.

21. The method of claim 1, whereby the image taken at the desired position is a lateral side bent open mouth view of the Atlanto-Axial Joint.

22. A system comprising:
at least one imaging device that images a face of a human head;
at least one processing device that generates at least one vertical facial line and at least two horizontal facial lines to be disposed on the image of the face via a display device, the at least one vertical facial line and the at least two horizontal facial lines based on facial markings of the face,
wherein the display device enables alignment of the human head such that the at least one vertical facial line is aligned with a generated vertical screen line and each of the at least two horizontal facial lines are aligned with at least one generated horizontal screen line, while facial lines alignment with the generated vertical and horizontal screen lines represent a 90 degrees face magi positioning; and
at least one memory that stores, the alignment as a baseline configuration, wherein a lower line of the aligned at least two horizontal facial lines and generated horizontal screen lines is stored as a default pitch line,
wherein upon repositioning the human head to a desired position by laterally rotating the human head around a sagittal axis of rotation to at least one side, the at least one processing device continuously updates the at least one vertical facial line and the at least two horizontal facial lines based on facial markings of the face and guides realignment of the human head at the desired position such that the default pitch line is represented by a continuous line and is parallel to an upper line of the at least two horizontal facial lines, the default pitch line and the upper horizontal facial line are perpendicular to the at least one vertical facial line and at least one vertical facial line aligns with the as least one vertical screen line, whereby an image taken the desired position is taken orthogonally in relation to a point of sagittal axis of rotation has no image angular distortion, and has no image angular distortion relative to an image of the same anatomy taken at the baseline position.

23. The system of claim 22, wherein the at least one processing device executes at least one facial recognition function for identifying the facial markings on the face as key points and connects the key points to draw the at least one vertical facial line and the at least two horizontal facial lines.

24. The system of claim 23, wherein the at least one facial recognition function includes a convolutional neural network.

25. The system of claim 22, whereby the image taken at the desired position is a lateral side bent open mouth view of the Atlanto-Axial Joint.

26. A system comprising:
a head gear configured to be disposed on a human head, the head gear including a center marking indicating the center of the head gear and an edge marking,
at least one imaging device that images a face of the human head;
at least one processing device that generates at least one vertical facial line and at least two horizontal facial lines to be disposed on the image of the face via a display device, the at least one vertical facial line and the at least two horizontal facial lines based on facial markings of the face;
the display device that enables alignment of the human head such that the at least one vertical facial line is aligned with a generated vertical screen line and each of the at least two horizontal facial lines are aligned with a generated horizontal screen line;
wherein the display device enables alignment of the center marking of the head gear to the at least one aligned vertical line and alignment of the edge marking of the head gear to at least one of the aligned horizontal lines; and
upon alignment, the at least one processing device stores the alignment of the head gear to the human head in at least one memory device as a baseline, wherein upon repositioning the human head to a desired position, the at least one processing device continuously updates the at least one vertical facial line and the at least two horizontal facial lines based on facial markings of the face.

* * * * *